US008061856B2

(12) United States Patent
Shirai et al.

(10) Patent No.: US 8,061,856 B2
(45) Date of Patent: Nov. 22, 2011

(54) PROJECTION APPARATUS AND IMAGE PROJECTION CHANGEOVER METHOD

(75) Inventors: Akira Shirai, Hino (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 487 days.

(21) Appl. No.: 12/286,585

(22) Filed: Oct. 1, 2008

(65) Prior Publication Data

US 2009/0033885 A1 Feb. 5, 2009

Related U.S. Application Data

(63) Continuation-in-part of application No. 11/121,543, filed on May 4, 2005, now Pat. No. 7,268,932, and a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/997,435, filed on Oct. 2, 2007.

(51) Int. Cl.
G03B 21/28 (2006.01)

(52) U.S. Cl. ............... 353/99; 353/30; 353/31; 353/77; 353/79; 353/98; 353/119; 353/122; 359/223.1; 359/224.1; 359/237; 359/242; 359/290

(58) Field of Classification Search ............ 353/30, 353/31, 77, 79, 98, 99, 84, 119, 122; 345/150, 345/151, 152, 589, 591, 592, 593, 597, 600, 345/603, 604, 605, 549, 690, 3.2, 22, 72, 345/83; 348/742, 743, 655, 656, 657, 658, 348/70, 68, 268, 269, 270, 755, 764, 77, 348/720; 359/726, 198, 224, 226, 385, 223, 359/872, 225; 362/551, 555, 553, 561
See application file for complete search history.

(56) References Cited

U.S. PATENT DOCUMENTS

| | | | |
|---|---|---|---|
| 5,214,420 A | 5/1993 | Thompson et al. | |
| 5,526,063 A | 6/1996 | Joubert et al. | |
| 5,668,611 A * | 9/1997 | Ernstoff et al. | 348/771 |
| 5,706,061 A * | 1/1998 | Marshall et al. | 348/743 |
| 6,348,907 B1 * | 2/2002 | Wood | 345/84 |
| 6,392,656 B1 * | 5/2002 | Someya et al. | 345/589 |
| 6,648,476 B2 | 11/2003 | Watanabe et al. | |
| 6,758,579 B2 * | 7/2004 | Ishikawa et al. | 362/238 |
| 7,165,845 B2 * | 1/2007 | Takeda et al. | 353/31 |
| 7,193,765 B2 | 3/2007 | Christensen et al. | |
| 2003/0015972 A1 * | 1/2003 | Suzuki | 315/291 |
| 2003/0142274 A1 * | 7/2003 | Gibbon et al. | 353/31 |

(Continued)

*Primary Examiner* — Georgia Y Epps
*Assistant Examiner* — Sultan Chowdhury
(74) *Attorney, Agent, or Firm* — Bo-In Lin

(57) ABSTRACT

The present invention provides a projection apparatus, comprising: a light source; a spatial light modulator for modulating the incident light emitted from the light source; a spatial light modulator control unit for generating, from an inputted image signal, a control signal for driving the spatial light modulator; and a light source control unit for receiving data corresponding to the control signal for controlling the light source to operate in one of three states consisted of a driven state, a stopped state and a standby state on the basis of the data.

26 Claims, 27 Drawing Sheets

U.S. PATENT DOCUMENTS

| | | | |
|---|---|---|---|
| 2003/0214639 A1* | 11/2003 | Patel et al. ............... | 353/98 |
| 2004/0105264 A1* | 6/2004 | Spero ...................... | 362/276 |
| 2005/0088625 A1* | 4/2005 | Imade ...................... | 353/31 |
| 2006/0008240 A1 | 1/2006 | Taft et al. | |

* cited by examiner

Fig. 1A (Prior Art)
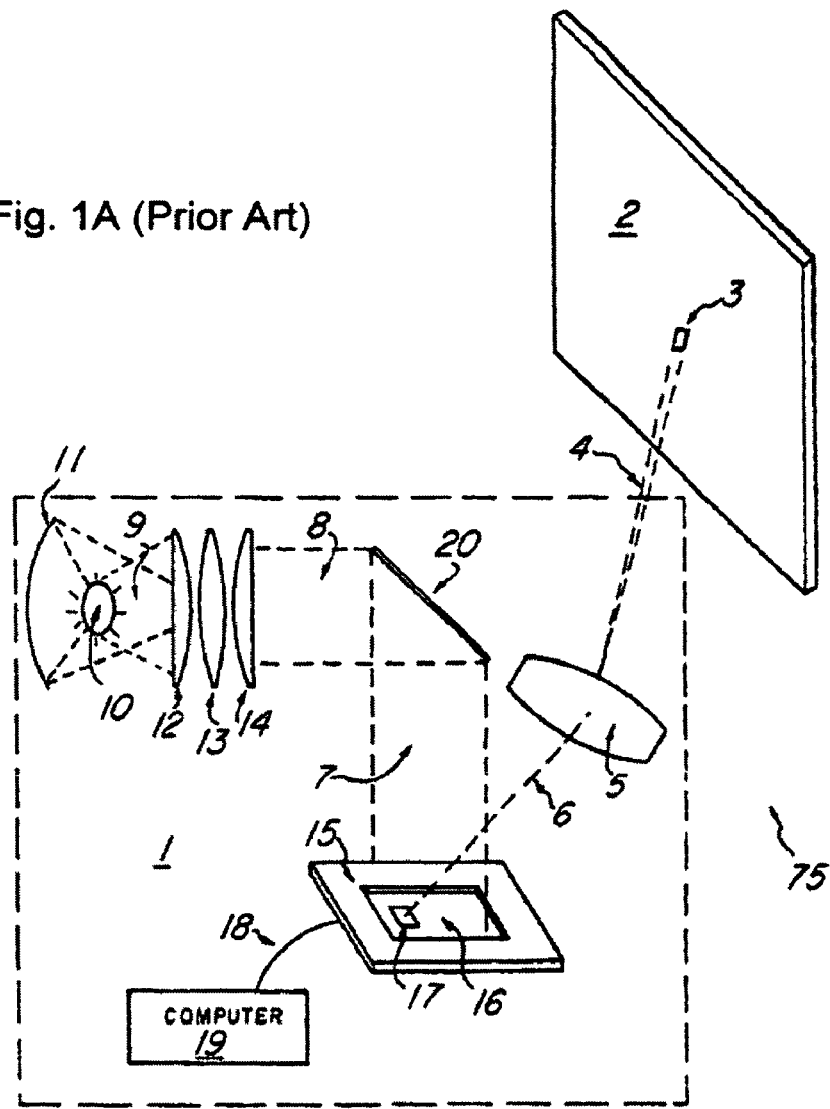
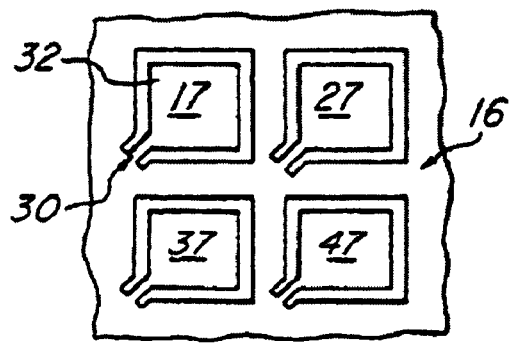
Fig. 1B (Prior Art)

section A-A'

PROJECTION APPARATUS AND IMAGE PROJECTION CHANGEOVER METHOD

CROSS REFERENCE TO RELATED APPLICATIONS

This application is a Non-provisional Application claiming a Priority date of Oct. 2, 2007 based on a previously filed Provisional Application 60/997,435 and a Non-provisional patent application Ser. No. 11/121,543 filed on May 4, 2005 issued into U.S. Pat. No. 7,268,932. The application Ser. No. 11/121,543 is a Continuation In Part (CIP) Application of three previously filed Applications. These three Applications are 10/698,620 filed on Nov. 1, 2003, now abandoned Ser. No. 10/699,140 filed on Nov. 1, 2003 now issued into U.S. Pat. No. 6,862,127, and Ser. No. 10/699,143 filed on Nov. 1, 2003 now issued into U.S. Pat. No. 6,903,860 by the Applicant of this patent applications. The disclosures made in these patent applications are hereby incorporated by reference in this patent application.

BACKGROUND OF THE INVENTION

1. Field of the Invention

The present invention relates generally to the system configuration and methods for controlling and operating a projection apparatus. More particularly, this invention related to an image projection apparatus implemented with a spatial light modulator and light source with a controller to control the image projection changeover process for operating the light source and the spatial modulator in different operation states.

2. Description of the Related Art

Even though there have been significant advances made in recent years in the technologies of implementing electromechanical micromirror devices as spatial light modulators (SLM), there are still limitations and difficulties when they are employed to display high quality images. Specifically, when the display images are digitally controlled, the quality of the images is adversely affected because the images are not displayed with a sufficient number of gray scale gradations.

An electromechanical mirror device is drawing a considerable interest as a spatial light modulator (SLM). The electromechanical mirror device consists of a mirror array arranging a large number of mirror elements. In general, the number of mirror elements range from 60,000 to several millions and are arranged on the surface of a substrate in an electromechanical mirror device.

Referring to FIG. 1A, an image display system 1 including a screen 2 is disclosed in a relevant U.S. Pat. No. 5,214,420. A light source 10 is used to generate light beams to project illumination for the display images on the display screen 2. The light 9 projected from the light source is further concentrated and directed toward lens 12 by way of mirror 11. Lenses 12, 13 and 14 form a beam columnator operative to columnate the light 9 into a column of light 8. A spatial light modulator 15 is controlled by a computer through data transmitted over data cable 18 to selectively redirect a portion of the light from path 7 toward lens 5 to display on screen 2. FIG. 1B shows a SLM 15 that has a surface 16 that includes an array of switchable reflective elements 17, 27, 37, and 47, each of these reflective elements is attached to a hinge 30. When the element 17 is in an ON position, a portion of the light from path 7 is reflected and redirected along path 6 to lens 5 where it is enlarged or spread along path 4 to impinge on the display screen 2 to form an illuminated pixel 3. When the element 17 is in an OFF position, the light is reflected away from the display screen 2 and, hence, pixel 3 is dark.

Each of the mirror elements constituting a mirror device functions as a spatial light modulator (SLM), and each mirror element comprises a mirror and electrodes. A voltage applied to the electrode(s) generates a coulomb force between the mirror and the electrode(s), making it possible to control and incline the mirror. The inclined mirror is "deflected" according to a common term used in this patent application for describing the operational condition of a mirror element.

When a mirror is deflected with a voltage applied to the electrode(s), the deflected mirror also changes the direction of the reflected light in reflecting an incident light. The direction of the reflected light is changed in accordance with the deflection angle of the mirror. The present patent application refers to the light reflected to a projection path designated for image display as "ON light", and refers to a light reflected in a direction other than the designated projection path for image display as "OFF light". When the light reflected by the mirror to the projection path is of lesser intensity than the "ON light", because only a portion of the reflected light is directed in the ON light direction, it is referred to as "intermediate light". The present patent application defines an angle of rotation along a clockwise (CW) direction as a positive (+) angle and that of a counterclockwise (CCW) direction as a negative (−) angle. A deflection angle is defined as zero degrees (0°) when the mirror is in the initial state.

The on-and-off states of the micromirror control scheme, as that implemented in the U.S. Pat. No. 5,214,420 and in most conventional display systems, impose a limitation on the quality of the display. Specifically, applying the conventional configuration of a control circuit limits the gray scale gradations produced in a conventional system (PWM between ON and OFF states), limited by the LSB (least significant bit, or the least pulse width). Due to the ON-OFF states implemented in the conventional systems, there is no way of providing a shorter pulse width than the duration represented by the LSB. The least quantity of light, which determines the gray scale, is the light reflected during the least pulse width. The limited levels of the gray scale lead to a degradation of the display image Specifically, FIG. 1C exemplifies, as related disclosures, a circuit diagram for controlling a micromirror according to U.S. Pat. No. 5,285,407. The control circuit includes memory cell 32. Various transistors are referred to as "M*" where "*" designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads in the memory cell 32. The memory cell 32 includes an access switch transistor M9 and a latch 32a based on a Static Random Access switch Memory (SRAM) design. All access transistors M9 on a Row line receive a DATA signal from a different Bit-line 31a. The particular memory cell 32 is accessed for writing a bit to the cell by turning on the appropriate row select transistor M9, using the ROW signal functioning as a Word-line. Latch 32a consists of two cross-coupled inverters, M5/M6 and M7/M8, which permit two stable states that include a state 1 when is Node A high and Node B low, and a state 2 when Node A is low and Node B is high.

The mirror is driven by a voltage applied to the landing electrode and is held at a predetermined deflection angle on the landing electrode. An elastic "landing chip" is formed on a portion on the landing electrode that makes contact with the mirror, and assists in deflecting the mirror towards the opposite direction when the deflection of the mirror is switched.

The landing chip is designed to have the same potential as the landing electrode, so that a shorting is prevented when the landing electrode is in contact with the mirror.

Each mirror formed on a device substrate has a square or rectangular shape, and each side has a length of 4 to 15 um. In this configuration, a portion of the reflected light is reflected not from the mirror surface but from the gaps between the mirrors or other surfaces of the structures of the mirror device. These "unintentional" reflections are not applied to project an image, however, are inadvertently generated and may interfere with the reflected light for image display. The contrast of the displayed image is degraded due to the interference generated from these unintentional reflections generated by the gaps between the mirrors. In order to overcome such problems, the mirrors are arranged on a semiconductor wafer substrate with a layout to minimize the gaps between the mirrors. One mirror device is generally designed to include an appropriate number of mirror elements, wherein each mirror element is manufactured as a deflectable mirror on the substrate for displaying a pixel of an image. The appropriate number of elements for displaying an image is configured in compliance with the display resolution standard according to the VESA Standard defined by Video Electronics Standards Association or by television broadcast standards. When a mirror device is configured with the number of mirror elements in compliance with WXGA (resolution: 1280 by 768) defined by VESA, the pitch between the mirrors of the mirror device is 10 μm, and the diagonal length of the mirror array is about 0.6 inches.

The control circuit, as illustrated in FIG. 1C, controls the mirrors to switch between two states, and the control circuit drives the mirror to oscillate to either an ON or OFF deflected angle (or position) as shown in FIG. 1A.

The minimum intensity of light reflected from each mirror element for image display, i.e., the resolution of gray scale of image display for a digitally controlled image display apparatus, is determined by the least length of time that the mirror may be controlled to stay in the ON position. The length of time a micromirror is in an ON position is controlled by a multiple bit word. FIG. 1D shows the "binary time intervals" when controlling micromirrors with a four-bit word. As shown in FIG. 1D, the time durations have relative values of 1, 2, 4, 8, which in turn define the relative brightness for each of the four bits where "1" is the least significant bit and "8" is the most significant bit. According to the control mechanism as shown, the minimum controllable differences between gray scales for showing different levels of brightness is a represented by the "least significant bit" that maintains the micromirror at an ON position.

For example, assuming n bits of gray scales, one time frame is divided into $2^n-1$ equal time periods. For a 16.7-millisecond frame period and n-bit intensity values, the time period is $16.7/(2^n-1)$ milliseconds.

Having established these times for each pixel of each frame, pixel intensities are quantified such that black is a 0 time period, the intensity level represented by the LSB is 1 time period, and the maximum brightness is $2^n-1$ time periods. Each pixel's quantified intensity determines its ON-time during a time frame. Thus, during a time frame, each pixel with a quantified value of more than 0 is ON for the number of time periods that correspond to its intensity. The viewer's eye integrates the pixel brightness so that the image appears the same as if it were generated with analog levels of light.

For controlling deflectable mirror devices, the PWM applies data to be formatted into "bit-planes", with each bit-plane corresponding to a bit weight of the intensity of light. Thus, if the brightness of each pixel is represented by an n-bit value, each frame of data has the n-bit-planes. Then, each bit-plane has a 0 or 1 value for each mirror element. According to the PWM control scheme described in the preceding paragraphs, each bit-plane is independently loaded and the mirror elements are controlled according to bit-plane values corresponding to the value of each bit during one frame. Specifically, the bit-plane according to the LSB of each pixel is displayed for 1 time period.

When adjacent image pixels are displayed with a very coarse gray scale caused by great differences in the intensity of light, thus, artifacts are shown between these adjacent image pixels. That leads to the degradations of image quality. The image degradations are especially pronounced in the bright areas of image where there are "bigger gaps" between of the gray scales of adjacent image pixels. The artifacts are generated by technical limitations in that the digitally controlled image does not provide a sufficient number of the gray scale.

As the mirrors are controlled to be either ON or OFF, the intensity of light of a displayed image is determined by the length of time each mirror is in the ON position. In order to increase the number of gray scales of a display, the switching speed of the ON and OFF positions for the mirror must be increased. Therefore the digital control signals need be increased to a higher number of bits. However, when the switching speed of the mirror deflection is increased, a stronger hinge for supporting the mirror is necessary to sustain the required number of switches between the ON and OFF positions for the mirror deflection. In order to drive the mirrors with a strengthened hinge, a higher voltage is required. The higher voltage may exceed twenty volts and may even be as high as thirty volts. The mirrors produced by applying the CMOS technologies are probably not appropriate for operating the mirror at such a high range of voltages, and therefore DMOS mirror devices may be required. In order to achieve a higher degree of gray scale control, more complicated production processes and larger device areas are required to produce the DMOS mirror. Conventional mirror controls are therefore faced with a technical problem in that accuracy of gray scales and range of the operable voltage have to be sacrificed for the benefits of a smaller image display apparatus.

There are many patents related to light intensity control. These patents include U.S. Pat. Nos. 5,589,852, 6,232,963, 6,592,227, 6,648,476, and 6,819,064. There are further patents and patent applications related to different light sources. These patents include U.S. Pat. Nos. 5,442,414, 6,036,318 and Application 20030147052. Also, U.S. Pat. No. 6,746,123 has disclosed particular polarized light sources for preventing the loss of light. However, these patents or patent applications do not provide an effective solution to attain a sufficient number of the gray scale in the digitally controlled image display system.

Furthermore, there are many patents related to a spatial light modulation including U.S. Pat. Nos. 2,025,143, 2,682,010, 2,681,423, 4,087,810, 4,292,732, 4,405,209, 4,454,541, 4,592,628, 4,767,192, 4,842,396, 4,907,862, 5,214,420, 5,287,096, 5,506,597, and 5,489,952. However, these inventions do not provide a direct solution for a person skilled in the art to overcome the above-discussed limitations and difficulties.

In view of the above problems, US Patent Application 20050190429 has disclosed a method for controlling the deflection angle of the mirror to express higher gray scales of an image. In this disclosure, the intensity of light obtained during the oscillation period of the mirror is about 25% to 37% of the intensity of light obtained while the mirror is held in the ON position continuously.

According to this control process, it is not necessary to drive the mirror at a high speed. Also, it is possible to provide a higher number of the gray scale using a hinge with a low elastic constant. Hence, such a control makes it possible to reduce the voltage applied to the landing electrode.

An image display apparatus using the mirror device described above is broadly categorized into two types: a single-plate image display apparatus implemented with only one spatial light modulator and a multi-plate image display apparatus implemented with a plurality of spatial light modulators. In the single-plate image display apparatus, a color image is displayed by changing, in turn, the color (i.e. frequency or wavelength) of projected light over time. In a multi-plate the image display apparatus, a color image is displayed controlling the multiple spatial light modulators, corresponding to beams of light having different colors (i.e. frequencies or wavelengths), to modulate and combine the beams of light continuously.

A projection apparatus comprising a spatial light modulator, such as the above-described mirror device has conventionally used an arc lamp light source such as a mercury lamp. Such a projection apparatus using an arc lamp light source is configured to switch between irradiating and not irradiating light onto a spatial light modulator by turning ON and OFF the arc lamp light source, thereby switching between projecting and not projecting an image.

Recently, semiconductor light sources, such as a laser light source, have attracts attention as a light source. Laser light possesses high directivity, providing advantages such as having a single wavelength and allowing pulse emission. The application of laser light sources have driven research in many fields (refer to: http://www.ite.or.jp/news/keyword/laser.html) with the development of projection apparatuses being no exception, and the U.S. Pat. No. 7,193,765 has disclosed a projection apparatus comprising a laser light source and a spatial light modulator.

Similar to a changeover control in a projection apparatus using an arc lamp light source, a projection apparatus using a laser light source can also switch between irradiating and not irradiating light onto a spatial light modulator by turning ON and OFF the laser light source, thereby switching between projecting and not projecting an image.

The control for turning ON and OFF the light source in order to switch between projecting and not projecting an image, however, requires a period of time to send an electric current through a circuit to turn on the light source and an emission preparation time period for the light source to emit light (when the light source is turned off and then turned on). Therefore, there is the problem of a slow rise of the light source and a slow response time in switching between projecting and not projecting an image. Furthermore, the fact that the response time in switching between projecting and not projecting an image is slow presents another limitation in projecting an image.

SUMMARY OF THE INVENTION

In consideration of the above-described problems, one aspect of the present invention is to improve the response time in switching the projection apparatus between projecting and not projecting an image such that the above-discussed problems and limitations may be resolved.

A first exemplary embodiment of the present invention provides a projection apparatus, comprising a light source, a spatial light modulator for modulating the incident light emitted from the light source, a spatial light modulator control unit for generating, from an inputted image signal, a control signal for driving the spatial light modulator, and a light source control unit for receiving data corresponding to the control signal and controlling the light source under any of a driven state, a stopped state and a standby state on the basis of the data.

A second exemplary embodiment of the present invention provides the display apparatus according to the first exemplary embodiment, wherein the standby state is a state for the light source outputting the incident light with which no image is projected or a state for the light source not outputting the incident light while it is driven.

A third exemplary embodiment of the present invention provides the display apparatus according to the first exemplary embodiment, wherein the light source performs pulse emission.

A fourth exemplary embodiment of the present invention provides the display apparatus according to the first exemplary embodiment, wherein the light source is a laser diode or a light emitting diode.

A fifth exemplary embodiment of the present invention provides the display apparatus according to the first exemplary embodiment, wherein the spatial light modulator comprises a plurality of mirrors each controlling the reflecting direction of the incident light.

A sixth exemplary embodiment of the present invention provides the display apparatus according to the first exemplary embodiment, wherein the light source control unit controls the output intensity of light in the standby state.

A seventh exemplary embodiment of the present invention provides the display apparatus according to the first exemplary embodiment, wherein the light source control unit controls the light source so that the drive current of the light source in the standby state is smaller than the drive current in the driven state and larger than the drive current in the stopped state.

An eighth exemplary embodiment of the present invention provides the display apparatus according to the first exemplary embodiment, wherein the light source control unit controls the light source so that the drive voltage of the light source in the standby state is smaller than the drive voltage in the driven state and larger than the drive voltage in the stopped state.

A ninth exemplary embodiment of the present invention provides the display apparatus according to the first exemplary embodiment, wherein the intensity of light emitted from the light source within a period corresponding to the least significant bit (LSB) of the data in the standby state is no more than the intensity of light required for displaying the gray scale represented by the LSB.

A tenth exemplary embodiment of the present invention provides the display apparatus according to the third exemplary embodiment, wherein the light source control unit controls the pulse emission of the light source so as to be in the driven state or the standby state.

An eleventh exemplary embodiment of the present invention provides the display apparatus according to the first exemplary embodiment, wherein the light source control unit performs a control so as to cause the light source to be in the standby state within a period other than the driven state.

A twelfth exemplary embodiment of the present invention provides the display apparatus according to the first exemplary embodiment, wherein the light source includes a red light source, a green light source and a blue light source, wherein the light source control unit performs a control so as to cause each of the red light source, green light source and blue light source to be in the standby state independently.

A thirteenth exemplary embodiment of the present invention provides an image projection changeover method for switching between projecting an image and not projection it by controlling a light source, comprising the steps of receiving a control signal for controlling the light source; and switching between projecting an image and not projecting it by controlling the light source under a first state for the light source outputting light at an intensity with which an image can be projected when the image is projected and a second state for the light source outputting light at an intensity with which no image can be projected or a third state for the light source outputting no light while the power for the light source is turned on when an image is not projected on the basis of the control signal.

A fourteenth exemplary embodiment of the present invention provides the display apparatus according to the thirteenth exemplary embodiment, wherein the light source emits light at no more than the volume of light required for displaying a gray scale represented by the least significant bit (LSB) within a period corresponding to the LSB of the control signal in the second state.

A fifteenth exemplary embodiment of the present invention provides the display apparatus according to the thirteenth exemplary embodiment, wherein the light source is a semiconductor light source.

A sixteenth exemplary embodiment of the present invention provides the display apparatus according to the thirteenth exemplary embodiment, wherein the light source includes a light source or sources with at least three primary colors of light, wherein the projection of the image is suppressed when the colors of the light source(s) are changed over.

A seventeenth exemplary embodiment of the present invention provides a projection apparatus, comprising a light source, a spatial light modulator for modulating the light emitted from the light source, an electric current supplier for supplying the light source with electric current, multiple switches which are placed between the light source and electric current supplier and each of which is connected in parallel, and a light source control circuit for controlling the switches independently from controlling the electric current supplier, in accordance with the control state of the spatial light modulator.

An eighteenth exemplary embodiment of the present invention provides the projection apparatus according to the seventeenth exemplary embodiment, further comprising a second switch which is placed between the light source and switches between an active state, in which the electric current supplier is electrically connected to the light source, and an inactive state, in which the aforementioned two components are not electrically connected to each other.

A nineteenth exemplary embodiment of the present invention provides the projection apparatus according to the eighteenth exemplary embodiment, further comprising a second electric current supplier constantly connected to the light source, wherein the light source emits light by the intensity no more than that which is required for displaying a gray scale represented by the least significant bit (LSB) within a period corresponding to the LSB that is a minimum unit of modulation for the spatial light modulator when the electric current supplier supplies the electric current and also the switch is in the inactive state.

A twentieth exemplary embodiment of the present invention provides the projection apparatus according to the nineteenth exemplary embodiment, wherein no image is projected with the light modulated by the spatial light modulator when the electric current supplier supplies the electric current and also the second switch is in the inactive state.

A twenty-first exemplary embodiment of the present invention provides the display apparatus according to the seventeenth exemplary embodiment, wherein the electric current supplier is placed close to the light source.

A twenty-second exemplary embodiment of the present invention provides the display apparatus according to the seventeenth exemplary embodiment, wherein the switch is placed in the vicinity of the light source.

A twenty-third exemplary embodiment of the present invention provides the display apparatus according to the seventeenth exemplary embodiment, further comprising a board, wherein the electric current supplier and the switch are mounted onto the board.

A twenty-fourth exemplary embodiment of the present invention provides the display apparatus according to the seventeenth exemplary embodiment, further comprising a board, wherein the board is connected to a cooling means that is the same means for the light source.

A twenty-fifth exemplary embodiment of the present invention provides the display apparatus according to the seventeenth exemplary embodiment, wherein the light source is a semiconductor light source arranged in array.

A twenty-sixth exemplary embodiment of the present invention provides the display apparatus according to the twenty-fifth exemplary embodiment, wherein each of the units of control of the semiconductor light source is implemented with at least two of the switches.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

The present invention is described in detail below with reference to the following figures.

FIG. 1A is a functional block diagram showing the configuration of a projection apparatus according to a conventional technique.

FIG. 1B is a top view diagram showing the configuration of a mirror element of a projection apparatus according to a conventional technique.

DESCRIPTION OF THE PREFERRED EMBODIMENTS

Outline of the Device

Projection apparatuses using a spatial light modulator, such as a transmissive liquid crystal, a reflective liquid crystal, a mirror array, etc., are widely known.

A spatial light modulator includes a two-dimensional array that arranges, enlarges, and then displays onto a screen by way of a projection lens arrayed as tens of thousands to millions of miniature modulation elements for projecting individual pixels corresponding to an image.

The spatial light modulators generally used for projection apparatuses are of primarily two types: 1) a liquid crystal device for modulating the polarizing direction of incident light; a liquid crystal is sealed between transparent substrates and provides them with a potential, and 2) a mirror device that deflects miniature micro electro mechanical systems (MEMS) mirrors with electrostatic force and controls the direction of reflected illumination light.

One embodiment of the above described mirror device is disclosed in U.S. Pat. No. 4,229,732, in which a drive circuit using MOSFET and deflectable metallic mirrors are set on a semiconductor wafer substrate. The mirror can be deformed by electrostatic force supplied from the drive circuit and is capable of changing the direction of reflected incident light.

Meanwhile, U.S. Pat. No. 4,662,746 has disclosed an embodiment in which one or two elastic hinges retain a mirror. If the mirror is retained by one elastic hinge, the elastic hinge functions as bending spring. If two elastic hinges retain the mirror, these two elastic hinges function as torsion springs to incline the mirror and thereby deflect the direction of reflected incident light.

Furthermore, as described above, the ON-and-OFF states of a micromirror control scheme as implemented in U.S. Pat. No. 5,214,420, and in most conventional display systems, impose a limitation on the quality of display. This is because in a conventionally configured control circuit, the gray scale of the conventional system (PWM between ON and OFF states) is limited by the LSB (least significant bit, or the least pulse width). Due to the ON-OFF states implemented in conventional systems, it is impossible to provide a shorter pulse width than the LSB. The least brightness, which determines gray scale, is the light reflected during the least pulse width. A limited number of gray scale leads to a degradation in the displayed image quality.

Figure 1C:
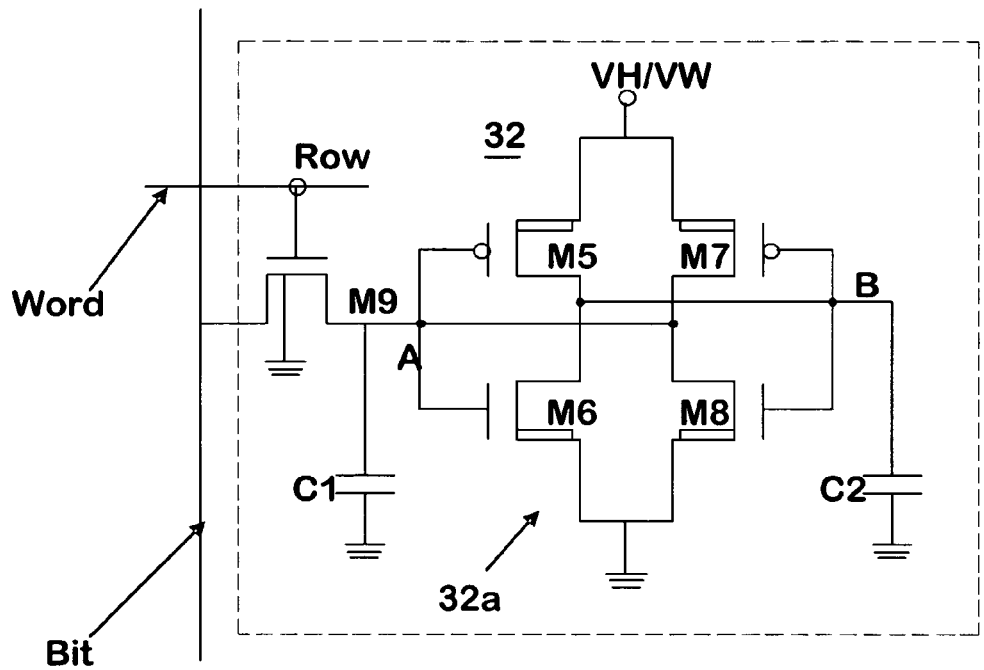
FIG. 1C is a circuit diagram showing the circuit configuration of the drive circuit of a mirror element of a projection apparatus according to a conventional technique.

Specifically, FIG. 1C shows a circuit diagram of a related art control circuit for a micromirror according to U.S. Pat. No. 5,285,407. The control circuit includes memory cell 32. Various transistors are referred to as "M*", where "*" denotes a transistor number, and each transistor is an insulated gate field effect transistor. Transistors M5 and M7 are p-channel transistors; transistors M6, M8, and M9 are n-channel transistors. The capacitances, C1 and C2, represent the capacitive loads available to memory cell 32. Memory cell 32 includes an access switch transistor M9 and a latch 32a, which is the basis of the Static Random Access switch Memory (SRAM) design. The transistor M9 in a Row-line receives a data signal via a Bit-line 31a. The memory cell 32 stores data and is accessed when the transistor M9 receives a ROW signal on a Word-line. Latch 32a consists of two cross-coupled inverters, M5/M6 and M7/M8, which permit two stable states: state 1 when Node A is high and Node B is low and state 2 when Node A is low and Node B is high.

The mirror, driven by a drive electrode, abuts a landing electrode structured differently from the drive electrode, and thereby a prescribed tilt angle is maintained. An elastic "landing chip" is set on the contact part abutting the landing electrode so that the mirror deflects in the opposite direction when voltage to applied to the electrode is switched. The landing chip and the landing electrode maintain the same potential in order to prevent short circuit damages upon contact.

[Outline of PWM Control]

Figure 1D:
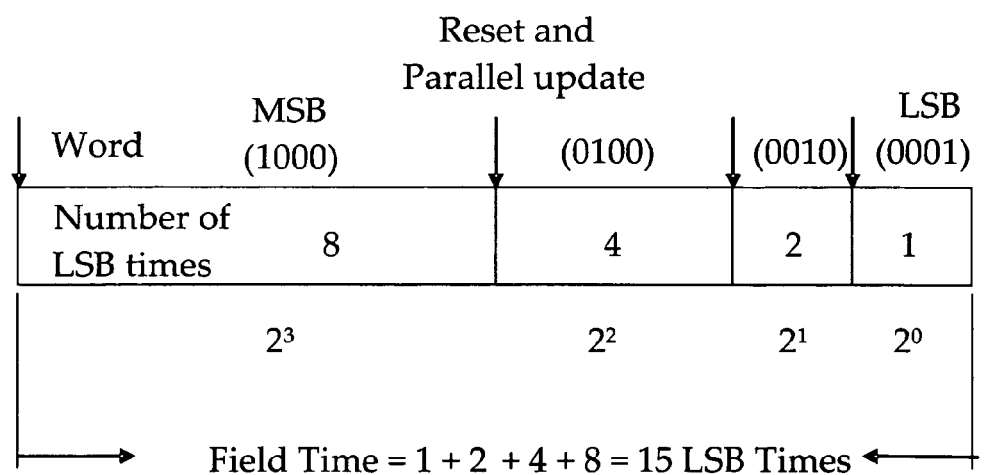
FIG. 1D is a timing diagram showing the mirror control time schemes according to the image data format used in a projection apparatus according to a conventional technique.

As described above, the control circuit positions the micromirrors in either an ON or OFF angular orientation (as shown in FIG. 1A). The brightness, i.e., the level of gray scales, of a display for a digitally controlled image system is determined by the length of time the micromirror stays at an ON position. The length of time a micromirror stays at an ON position is in turn controlled by a multiple bit word. As a simple illustration, FIG. 1D shows the "binary time intervals" with control by a four-bit word. As shown in FIG. 1D, time durations have relative values of 1, 2, 4, 8 that in turn define the relative brightness for each of the four bits where "1" is the least significant bit and "8" is the most significant bit. The minimum difference between gray scales for indicating different light intensities is limited by the "least significant bit" that maintains the micromirror at an ON position. For example, assuming an n-bit gray scale, the time frame is divided into $(2^n-1)$ equal time periods. For a 16.7-millisecond time frame and n-bit intensity values, the time period is $16.7/(2^n-1)$ milliseconds. Having established these times, for each pixel of each frame, pixel intensities are quantified, such that black is "0" time period, the intensity level represented by the LSB is "1" time period, and maximum brightness is "15" time periods (in the case of n=4). The quantified intensity of each pixel determines its ON-time during a time frame. Thus, during a time frame, each pixel with a quantified value of more than "0" is ON for the number of time periods that correspond to its intensity. The viewer's eye integrates the pixel brightness so that the image appears as if it were generated with analog levels of light.

To address this limitation in mirror devices, a pulse width control (PWM) scheme calls for data formatted into "bit-planes", each bit-plane corresponding to the bit weight of the intensity value. Thus, if the intensity of each pixel is represented by an n-bit value, each frame of data has n bit-planes. Each bit-plane has "0" or "1" value for each display element. In the PWM example described in the preceding paragraphs, during a frame, each bit-plane is separately loaded and the display elements are addressed in accordance with their associated bit-plane values. For example, the bit-plane representing the LSB of each pixel is displayed for 1 time period.

[Outlines of Mirror Size and Resolution]

The size of the mirrors of such a mirror device is between 4 μm and 10 μm for each side. The mirrors are placed on a semiconductor wafer substrate in such a manner as to minimize the gap between adjacent mirrors so that excess reflected light from the gap does not degrade the contrast of a modulated image.

The mirror device comprises the appropriate number of mirror elements as image display elements. The appropriate number of image display elements is determined in compliance with the display resolution specified by the Video Electronics Standards Association (VESA) and the television broadcasting standard. In the case of a mirror device comprising the number of mirror elements compliant to the WXGA (with the resolution of 1280×768) specified by the VESA, and in which mirrors are arrayed in intervals (noted as "pitch" hereinafter) of 10 μm, a sufficiently miniature mirror device is configured with about 15.49 mm (0.61 inches) as the diagonal length of the display area.

[Outline of Projection Apparatus]

The projection apparatuses using deflection-type ("deflectable") light modulators are primarily categorized into two types: a single-panel projection apparatus comprising a single spatial light modulator, which spatially changes the frequency of a projection light and displays an image in colors, and a multi-panel projection apparatus comprising spatial light modulators, which constantly modulate the illumination light with different frequencies by means of individual spatial light modulators and displays an image in colors by synthesizing these modulated lights.

The single-panel projection apparatus is constituted as described above by referring to FIG. 1A.

[Outline of the Introduction of Laser Light Source]

Figure 2A:
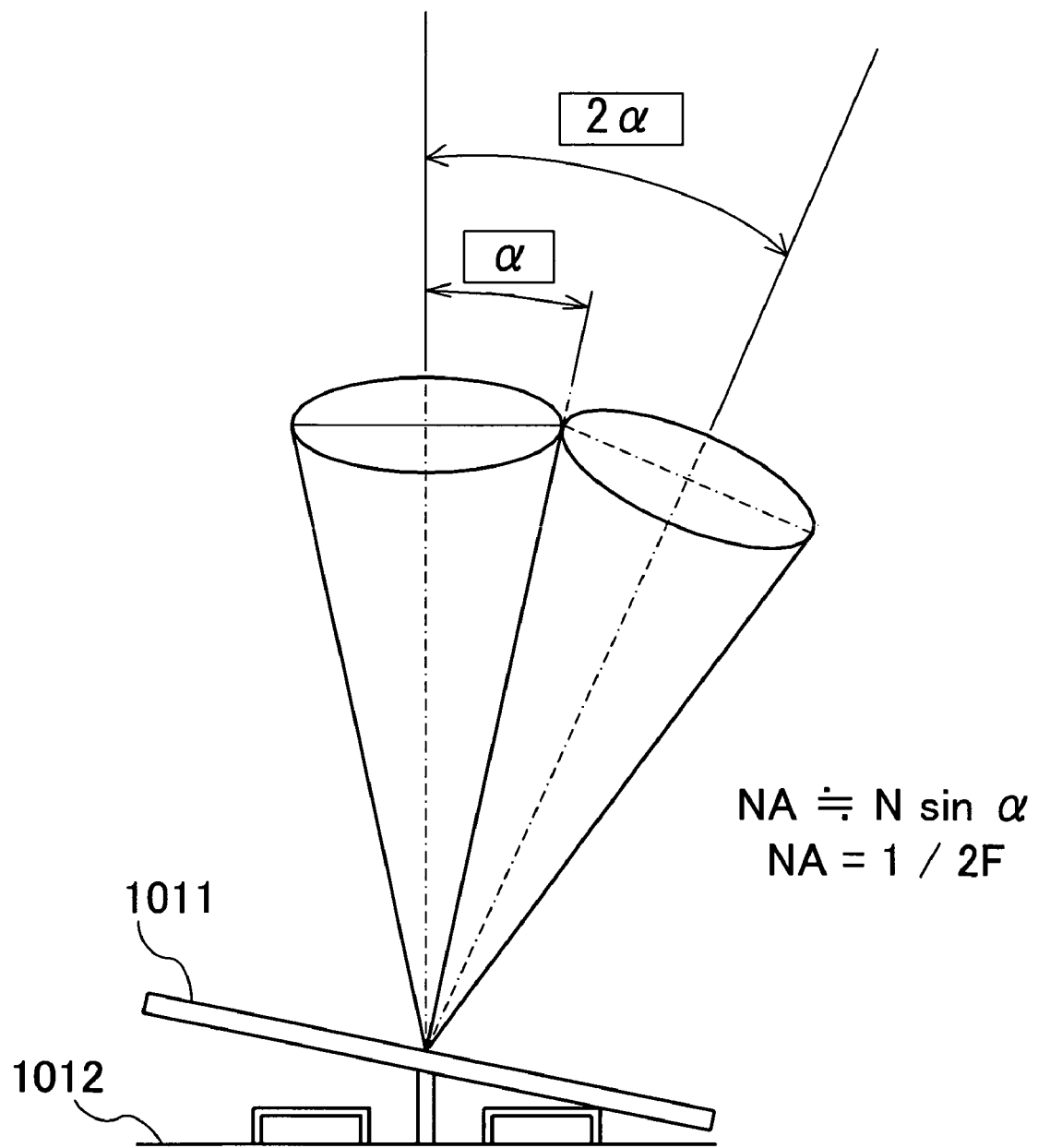
FIG. 2A is a diagram showing the relationship between the numerical aperture NA1 of an illumination light path, the numerical aperture NA2 of a projection light path, and the tilt angle α of a mirror.

In the projection apparatus that includes a reflective spatial light modulator implemented with a mirror described above, there is a close relationship between the numerical aperture (NA) NA1 of an illumination light path, the numerical aperture NA2 of a projection light path, and the tilt angle α of a mirror. FIG. 2 shows the relationship between them.

Assuming that the tilt angle α of a mirror 1011 is 12 degrees, when a modulated light reflected by mirror 1011 and incident to the center of the projection light path is set perpendicular to a device substrate 1012, the illumination light is incident from a direction inclined by 2α, that is, 24 degrees, relative to the perpendicular of the device substrate 1012. For the light beam reflected by the mirror to be most efficiently incident to the center of the projection lens, the numerical aperture of the projection light path should be equal to the numerical aperture of the illumination light path. If the numerical aperture of the projection light path is smaller than that of the illumination light path, the illumination light cannot be sufficiently projected into the projection light path. However, if the numerical aperture of the projection light path is larger than that of the illumination light path, the illumination light can be entirely directed. The projection lens then becomes unnecessarily large. Further in this event, the light fluxes of the illumination light and projection light need to be placed apart from each other because the optical members of the illumination system and those of the projection system need to be physically separated. Keeping the above considerations in mind, when a spatial light modulator with the tilt angle of a mirror being 12 degrees is used, the numerical aperture (NA) NA1 of the illumination light path and the numerical aperture NA2 of the projection light path are preferably set as follows:

$$NA1=NA2=\sin\alpha=\sin 12°$$

If the F-number of the illumination light path is F1 and the F-number of the projection light path is F2, then the numerical aperture can be converted into an F-number as follows:

$$F1=F2=1/(2*NA)=1/(2*\sin 12°)=2.4$$

In order to maximize the use of illumination light emitted from a non-coherent light source, such as a high-pressure mercury lamp or a xenon lamp, which is generally used for projection apparatuses, the projection angle of light must be maximized on the illumination light path side. Since the numerical aperture of the illumination light path is determined by the tilt angle of a mirror to be used, it is clear that the tilt angle of the mirror needs to be large in order to increase the numerical aperture of the illumination light path.

Increasing the tilt angle of the mirror, however, requires a higher drive voltage for driving the mirror. If the tilt angle of the mirror is increased, the distance between the mirror and an electrode for driving the mirror also needs to be increased in order to secure a physical space for the mirror to be tilted. The electrostatic force F generated between the mirror and electrode is given by the following equation:

$$F=(\epsilon*S*V^2)/(2*d^2),$$

where "S" is the area size of the electrode, "V" is a voltage, "d" is the distance between the electrode and mirror, and "$\epsilon$" is the permittivity of vacuum.

The equation shows that the drive force decreases in proportion to the second power of the distance d between the electrode and the mirror. It is possible to increase the drive voltage to compensate for the decrease in the drive force associated with the increase in the distance; conventionally, however, the drive voltage is about 3 to 15 volts in the drive circuit by means of a CMOS process used for driving a mirror and, therefore, a relatively special process such as a DMOS process is required if a drive voltage in excess of about 15 volts is needed. That is not preferable since cost reduction remains a consideration.

Furthermore, in order to reduce the cost of a mirror device, it is desirable to obtain as many mirror devices as possible from a single semiconductor wafer substrate to increase productivity. That is, a decrease in the size of mirror elements reduces the size of the mirror device. It is clear that the area size of an electrode is reduced in association with a decrease in the size of the mirror, which also requires less driving power in accordance with the above equation.

In contrast to the need to decrease the size of a mirror device, the larger a mirror device, the brighter it can illuminate, as long as a conventional lamp is used. This is because a conventional lamp with a non-directive emission allows the usage efficiency of light to be substantially reduced. This is attributable to a relationship commonly called etendue.

Figure 2B:
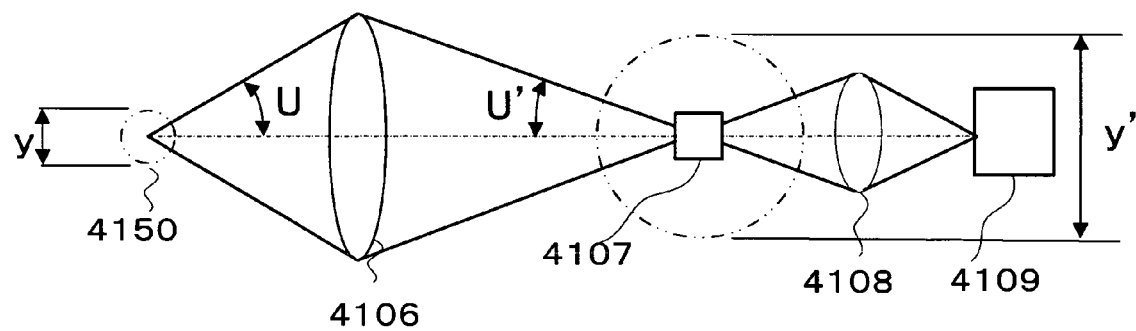
FIG. 2B is a side cross-sectional view for illustrating etendue by exemplifying the case of using a discharge lamp light source and projecting an image by way of an optical device.

FIG. 2B is an illustrative diagram for describing etendue by exemplifying the case of using an arc discharge lamp light source and projecting an image by way of an optical device. Let "y" be defined as the size of a light source 4150, and "u" as the angle of light with which an optical lens 4106 imports the light from the light source. Further, "u'" is the converging angle on the image side converged by using the optical lens 4106, and "y'" is the size of an image projected onto a screen 4109 by way of a projection lens 4108 after using an optical device 4107 for the converged light. Here, there is a relationship called etendue between size y of the light source 4150, the import angle u of light, the converging angle u' on the image side, and the size y' of an image, as follows:

$$y*u=y'*u'$$

That is, the smaller the device onto which a light source will project an image, the smaller the importing angle on the light source side becomes. This is why it is advantageous to use a laser light source, which possesses strong directivity of emission light, in order to decrease the size of the mirror device.

[Outline of Resolution Limit]

The following discussion is based on an examination of the limit value of the aperture ratio of a projection lens used for a projection apparatus. The projection lens displays the image on a display surface by enlarging the image modulated with specific resolution and reflected from a spatial light modulator. The resolution of the projected image can be further understood according to the following descriptions.

A symbol "Rp" denotes the pixel size of the spatial light modulator, "NA" represents the aperture ratio of a projection lens, "F" is an F number and "$\lambda$" is the wavelength of light, the limitative "Rp" with which any adjacent pixels on the projection surface are separately observed is derived by the following equation:

$$Rp=0.61*\lambda/NA=1.22*\lambda*F$$

The table below shows the F value of a projection lens and the deflection angle of a mirror by shrinking the mirror size that further shortens the distance between the adjacent mirror elements. The wavelength of the light beam is designated at a value of $\lambda=650$ nm representing a lowest value within the range of visible light. Meanwhile, the F value of a projection lens with the wavelength designated at 700 nm is about 7% smaller than the F value for the wavelength of 650 nm.

| Pixel size of mirror device [μm] | F number of projection lens | Deflection angle of mirror [degrees] |
| --- | --- | --- |
| 4 | 5.04 | 5.69 |
| 5 | 6.30 | 4.55 |
| 6 | 7.56 | 3.79 |
| 7 | 8.82 | 3.24 |
| 8 | 10.08 | 2.84 |
| 9 | 11.34 | 2.52 |
| 10 | 12.61 | 2.27 |
| 11 | 13.87 | 2.06 |

Therefore, since the difficulties related to the above described concerns with etendue is circumvented by using a laser light for the light source, the F numbers of the lenses for the illumination system and projection system can be increased to the values shown in the table. Therefore, it is possible to decrease the deflection angle of the mirror element, and thereby, a smaller mirror device with a low drive voltage can be configured.

[Outline of Oscillation Control]

Another method for reducing the drive voltage, other than minimizing the mirror tilt angle, is disclosed in US Patent Application 20050190429. According to this method, a mirror is put into free oscillation in the inherent oscillation frequency, and the intensity of light during the oscillation period of the mirror is thereby reduced to about 25% to 37% of the emission light intensity for a mirror that is controlled under a constant ON-state.

With this method there is no particular need to drive the mirror in high speed, making it possible to obtain a high level of gradation with a low spring constant in the spring member supporting the mirror, which allows for a reduction in drive voltage.

As described above, the adoption of a light source with directivity, such as a laser light source, makes it possible to reduce the deflection angle of a mirror and the size of the mirror device without decreasing the brightness of the light source. Furthermore, such a light source improves gradation without requiring an increase drive voltage if employed with the above described oscillation control.

There is, however, the problem of decreased efficiency of space usage of an electrode, as in the conventional configuration, when the electrode for driving a mirror and the stopper for determining the deflection angle of the mirror are individually configured.

U.S. Pat. No. 5,583,688, US Patent Application 20060152690, U.S. Pat. No. 6,198,180 and U.S. Pat. No. 6,992,810 have disclosed a structure for regulating the modulation angle of a mirror of a conventional mirror device. Each of the disclosed methods is configured with a structure, which makes it difficult to increase the size of an address electrode. Therefore, considering the above-described problem, a first embodiment of the present invention is characterized to configure a mirror device so as to integrate the electrode for driving the mirror element with the stopper for determining the deflection angle of a mirror.

First Embodiment

The following is a description, in detail, of a mirror device according to the present embodiment.

Figure 3A:
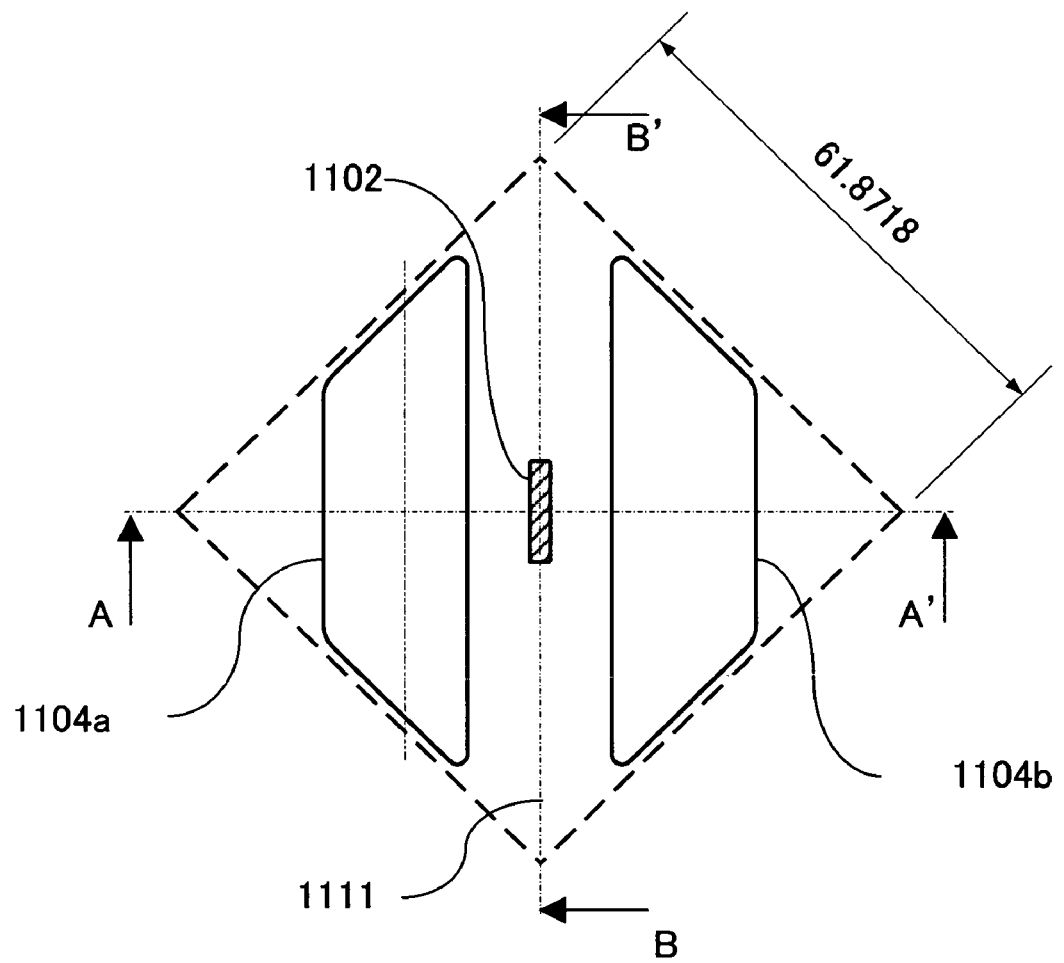
FIG. 3A is a top view diagram illustrating an example of a mirror element of a mirror device according to a preferred embodiment of the present invention.
Figure 3B:
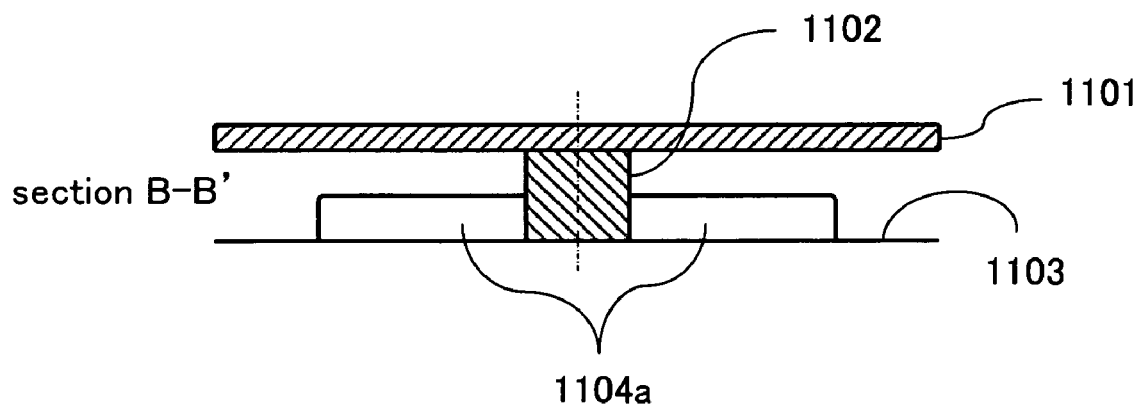
FIG. 3B is a cross-sectional view of a part along line B-B' of a mirror element of the mirror device shown in FIG. 3A according to a preferred embodiment of the present invention.
Figure 3C:
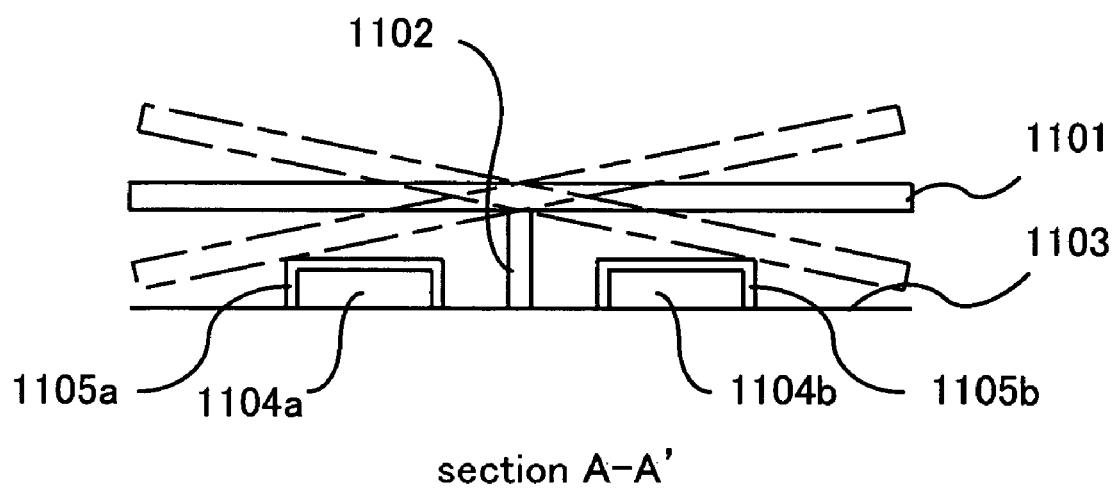
FIG. 3C is a cross-sectional view of a part along line A-A' of a mirror element of the mirror device shown in FIG. 3A according to a preferred embodiment of the present invention.

FIGS. 3A, 3B and 3C are diagrams exemplifying the configuration of a mirror element of a mirror device according to the present embodiment. FIG. 3A is a top view of a mirror illustrating the configuration of the mirror element of a mirror device according to the preferred embodiment. FIG. 3B is a side cross-sectional view illustrating the configuration of the mirror element of a mirror device according to the preferred embodiment. FIG. 3C is another side cross-sectional view illustrating the configuration of the mirror element of a mirror device according to the preferred embodiment.

FIGS. 3A to 3C show a mirror element that includes a mirror 1101 having a highly reflective top surface coated with material, such as aluminum or gold. The mirror 1101 is supported by an elastic hinge 1102 made of a silicon material, a metallic material and the like, and is placed on a substrate 1103. The silicon material may include poly-silicon, single crystal silicon and amorphous silicon, while the metallic material may include aluminum, titanium, an alloy of some of these metallic materials, or a composite of these metals or alloys. The mirror 1101 is in the approximate shape of a square, with the length of one side, for example, between 4 µm and 11 µm. The size of adjacent mirrors is also between, for example, 4 µm and 11 µm. The deflection axis 1111 of the mirror 1101 is on the diagonal line. The lower end of the elastic hinge 1102 is connected to the substrate member 1103 that includes a circuit for driving the mirror 1101. The upper end of the elastic hinge 1102 is connected to the bottom surface of the mirror 1101. An electrode for reliably maintaining electrical connectivity and an intermediate member for strengthening the support structures and strengthening the connection may be placed between the elastic hinge 1102 and substrate 103, or between the elastic hinge 1102 and mirror 1101.

In FIGS. 3A through 3C, electrodes 1104 (i.e., 1104a and 1104b) used for driving the mirror 1101 are placed on the top surface of the substrate 1103 opposite to the bottom surface of the mirror 1101. The form of the electrode 1104 may be symmetrical or asymmetrical about the deflection axis 1111. The electrode 1104 is made of aluminum or tungsten.

Figure 4A:
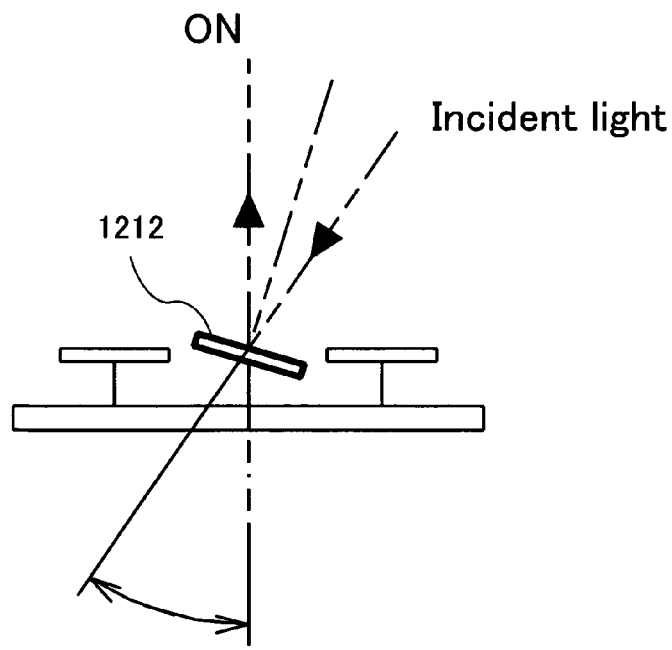
FIG. 4A is a side view diagram showing an example of a deflection state when the mirror comprised in the mirror element of a mirror device is ON, according to a preferred embodiment of the present invention.
Figure 4C:
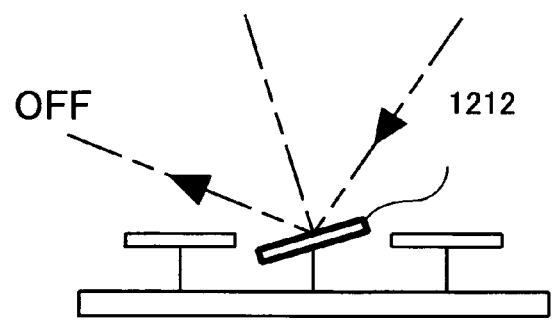
FIG. 4C is a side view diagram showing another example of a deflection state when the mirror comprised in the mirror element of a mirror device is OFF, according to a preferred embodiment of the present invention.
Figure 4B:
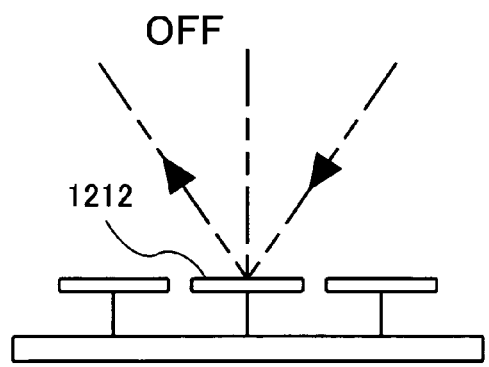
FIG. 4B is a side view diagram showing an example of a deflection state when the mirror comprised in the mirror element of a mirror device is OFF, according to a preferred embodiment of the present invention.

FIGS. 4A to 4C show the light reflection from the mirrors. The mirror configuration and operation of mirror deflections present different deflection states when different voltages are applied to the electrodes. The light incident to the mirror 1212 is deflected in specific directions, as shown in FIGS. 4A through 4C.

The following description outlines the natural oscillation frequency of the oscillation system of a mirror device according to the present embodiment.

As discussed above, a reduced drive voltage, when applied to a mirror with intermediate oscillation states, can achieve a gray scale with higher resolution. With a least significant bit (LSB) defining a minimum controllable light intensity in a pulse width modulator (PWM) through mirror oscillation, the natural oscillation cycle of an oscillating mirror supported on an elastic hinge is further described below.

The natural oscillation cycle T of an oscillation system can be determined as:

$$T=2*\pi*\sqrt{(I/K)}=\text{LSB time}/X \text{ [\%]};$$

where:
  I: the rotation moment of an oscillation system,
  K: the spring constant of an elastic hinge,
  LSB time: the LSB cycle at displaying n bits, and
  X [%]: the ratio of the light intensity obtained by one oscillation cycle to the Full-ON light intensity of the same cycle Note that:
  "I" is determined by the weight of the mirror and the distance between the center of gravity and the center of rotation;
  "K" is determined from the thickness, width, length, material and cross-sectional shape of an elastic hinge;
  "LSB time" is determined from one frame time, or one frame time and the number of reproduction bits in the case of a single-panel projection method;
  "X" is determined according to the above description, particularly from the F-number of a projection lens and the intensity distribution of an illumination light.

As an example, when a single-panel color sequential method is employed, the ratio of emission intensity by one oscillation is assumed to be 32%, and the minimum emission intensity in a 10-bit grayscale is achievable by an oscillation, then "I" and "K" are designed so as to have a natural oscillation cycle as follows:

$$T=1/(60*3*2^{10}*0.32)\approx 17.0 \text{ }\mu\text{sec}.$$

In contrast, when a conventional PWM control is employed, the changeover transition time $t_M$ of a mirror is approximately equal to the natural oscillation frequency of the oscillation system of the mirror. Accordingly, the LSB is required to control the mirror so that the light intensity in the interim during the changeover transition can be ignored. The gray scale reproducible with the above-described hinge is about 8-bit, even if the LSB is set at five times the changeover transition time $t_M$. Therefore, compared with a conventional display system, the display systems of this invention can achieve an image display with a 10-bit grayscale by using the 8-bit grayscale control signals because of the implementation of the intermediate control states.

In another exemplary embodiment for an image display system to display image with a 13-bit gray scale by a single-panel projection apparatus, the length of time represented by a LSB can be calculated as follows:

$$\text{LSB time}=(1/60)*(1/3)*(1/2^{13})=0.68 \text{ μsec}$$

For a display system with an intermediate control state, controllable to project 38% of the ON state intensity, the oscillation cycle T is as follows:

$$T=0.68/0.38\%=1.8 \text{ μsec}$$

In contrast, when attempting to obtain an 8-bit grayscale in a multi-panel projection apparatus described above, the length of time represented by the LSB can be calculated as follows:

$$\text{LSB time}=(1/60)*(1/3)*(1/2^{8})=21.7 \text{ μsec}$$

In another exemplary embodiment, when the light intensity obtained in one cycle by controlling the mirror to operate in an intermediate state is 20% of the ON state intensity, then the oscillation cycle T can be set as follows:

$$T=21.7/20\%=108.5 \text{ μsec.}$$

As described above, the present embodiment is configured to set the mirror to oscillate with a natural oscillation cycle of the oscillation system. The display system includes an elastic hinge. The natural oscillation cycle can be set between about 1.8 μsec and 108.5 μsec with three deflection states. The mirror element in a first deflection state is modulated by the mirror element directed towards the projection light path. The mirror element in the second deflection state is controlled to reflect a light in a direction away from the projection light path. The mirror element in a third deflection state is controlled to oscillate between the first and second deflection states. The intermediate state provides a reduced amount of controllable light, thus enabling the display system to display images of a gray scale with higher resolution without increasing the drive voltage of the mirror element.

As described above, the present embodiment is configured to make the electrode also function as a stopper for regulating the maximum deflection angle of the mirror. By configuring the electrode to also serve as a stopper increases the efficiency of space usage while shrinking the mirror element and expanding the area of the electrode.

Second Embodiment

The following is a description, in detail, of the preferred embodiment of the present invention with reference to the accompanying drawings.

Figure 5:
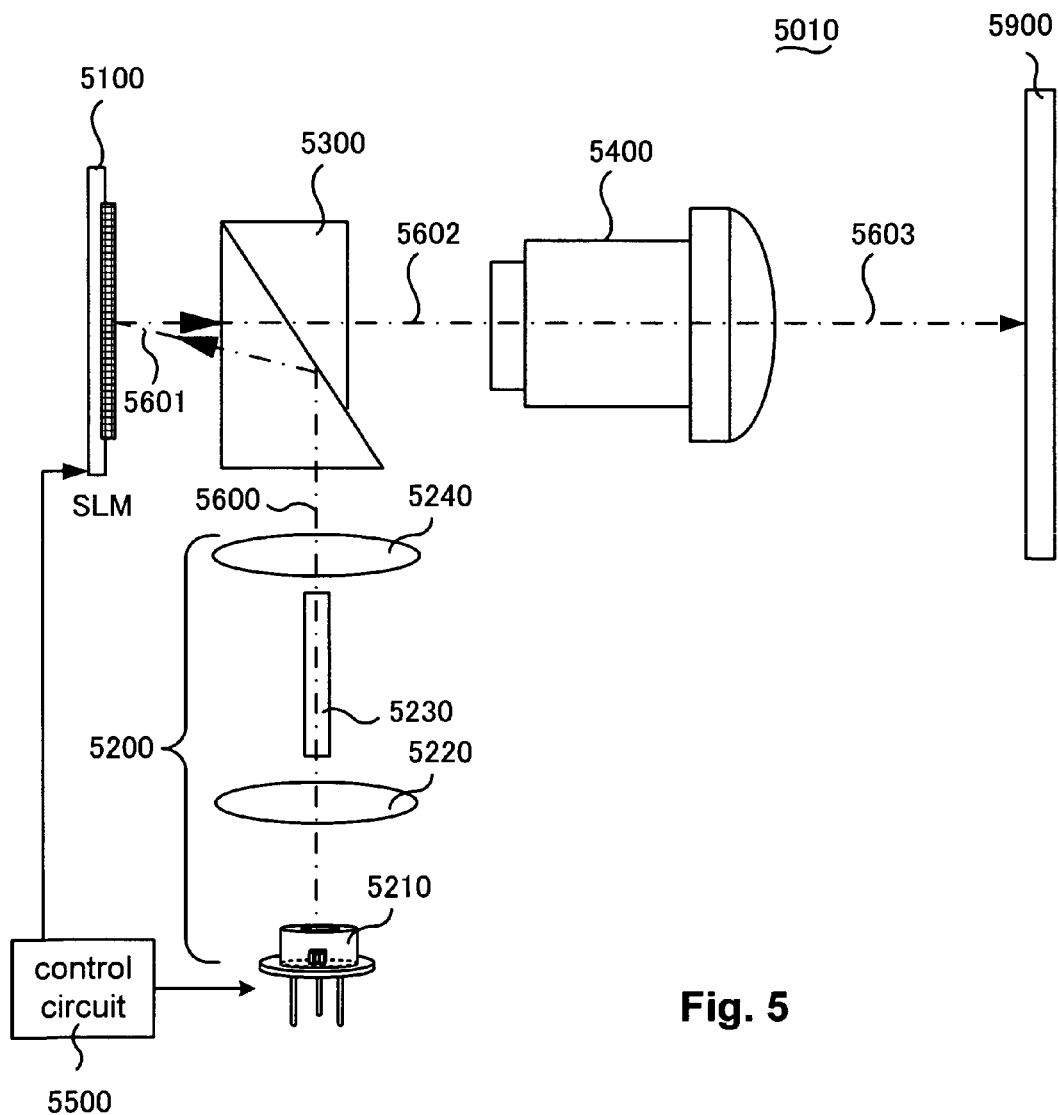
FIG. 5 is a functional block diagram showing the configuration of a single-panel projection apparatus according to a preferred embodiment of the present invention.

FIG. 5 is a block diagram showing the configuration of a projection apparatus according to a preferred embodiment of the present invention.

FIG. 5 shows a projection apparatus 5010 according to the present embodiment comprising a single spatial light modulator (SLM) 5100, a control unit 5500, a Total Internal Reflection (TIR) prism 5300, a projection optical system 5400 and a light source optical system 5200.

The projection apparatus 5010 is commonly referred to as a single-panel projection apparatus 5010 that includes a single spatial light modulator 5100.

The projection optical system 5400 includes a spatial light modulator 5100 and a TIR prism 5300 disposed along the optical axis of the projection optical system 5400. The light source optical system 5200 is disposed for projecting a light along the optical axis, which matches with the optical path of the projection optical system 5400.

The TIR prism 5300 receives the incoming illumination light 5600, projected from the light source optical system 5200, and directs the light to transmit as incident light 5601 to the spatial light modulator 5100 at a prescribed inclination angle. The SLM 5100 further reflects and transmits the reflection light 5602, towards the projection optical system 5400.

The projection optical system 5400 receives the light 5602 reflected from the SLM 5100 and projects it onto a screen 5900 as projection light 5603.

The light source optical system 5200 comprises a variable light source 5210 for generating the illumination light 5600, a condenser lens 5220 for focusing the illumination light 5600, a rod type condenser body 5230 and a condenser lens 5240.

The variable light source 5210, condenser lens 5220, rod type condenser body 5230 and condenser lens 5240 are sequentially placed in the aforementioned order along the optical axis of the illumination light 5600 emitted from the variable light source 5210 and incident to the side face of the TIR prism 5300.

The projection apparatus 5010 employs a single spatial light modulator 5100 for projecting a color display on the screen 5900 by applying a sequential color display method. Specifically, the variable light source 5210 comprises a red 5211, green 5212, and blue 5213 laser light source (not specifically shown here). The variable light source allows independent controls for the light emission states. The controller of the variable light source performs an operation of dividing one frame of display data into a plurality of sub-fields (i.e., three sub-fields, that is, red (R), green (G) and blue (B) in the present case) and turns on each of the red 5211, green 5212 and blue 5213 laser light source to emit each respective light in time series at the time band corresponding to the sub-field of each color as will be described later.

Figure 6:
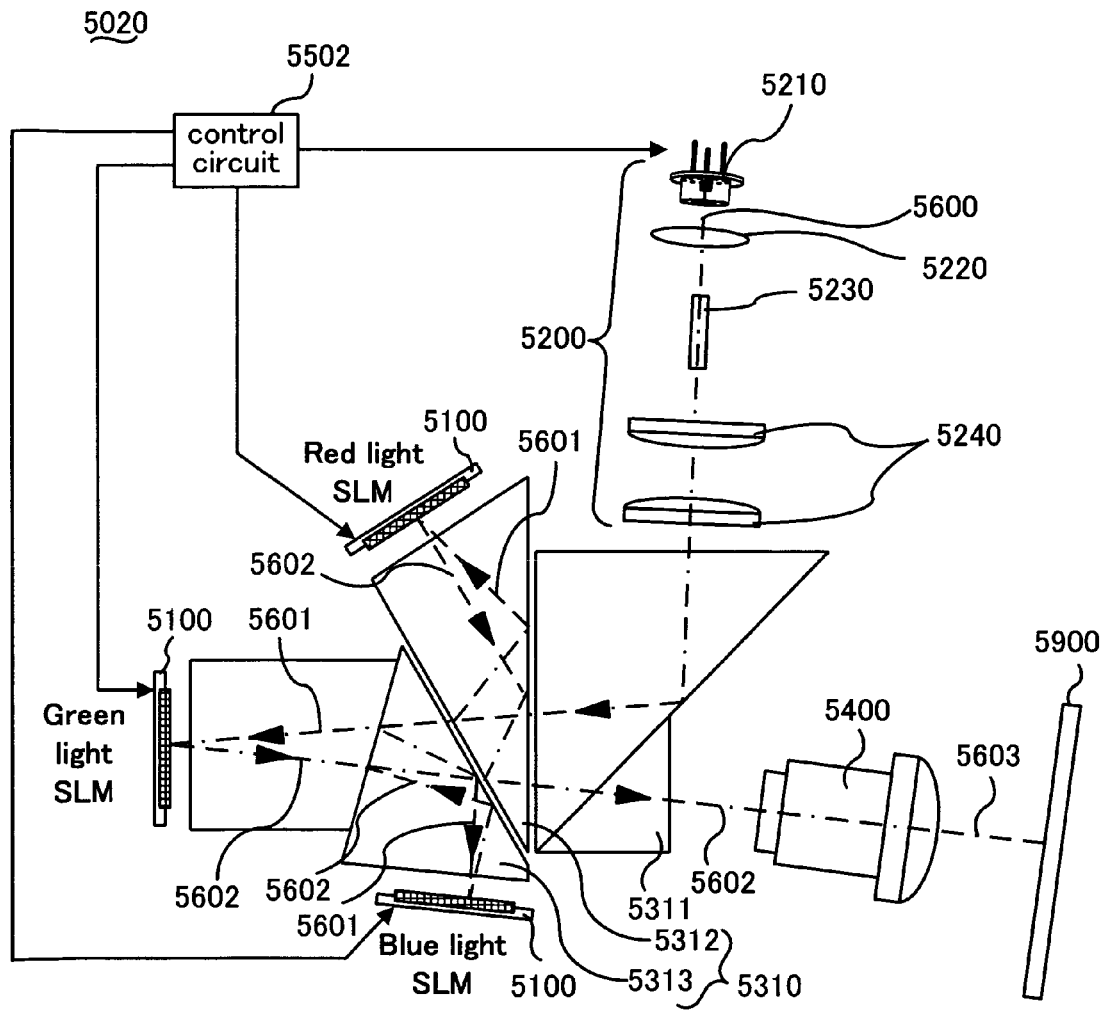
FIG. 6 is a functional block diagram showing the configuration of a multi-panel projection apparatus according to a preferred embodiment of the present invention.

FIG. 6 is a functional block diagram for showing the configuration of a projection apparatus according to an alternate preferred embodiment of the present invention.

The projection apparatus 5020 is commonly referred to as a multiple-plate projection apparatus that includes a plurality of spatial light modulators 5100 instead of a single SLM included in the single-panel projection apparatus 5010 described earlier. Further, the projection apparatus 5020 comprises a control unit 5502 in place of the control unit 5500.

The projection apparatus 5020 comprises a plurality of spatial light modulators 5100, and further includes a light separation/synthesis optical system 5310 between the projection optical system 5400 and each of the spatial light modulators 5100.

The light separation/synthesis optical system 5310 comprises a plurality of TIR prisms, i.e., a TIR prism 5311, a prism 5312, and a prism 5313.

The TIR prism 5311 carries out the function of directing the illumination light 5600 projected along the optical axis of the projection optical system 5400 and directs the light to the spatial light modulator 5100 as incident light 5601.

The TIR prism 5312 carries out the function of separating red (R) light from an incident light 5601, projected by way of the TIR prism 5311, transmits the red light to the spatial light modulators for the red light 5100. The TIR prism 5312 further carries out the function of directing the reflection light 5602 of the red light to the TIR prism 5311.

Likewise, the prism 5313 carries out the functions of separating blue (B) and green (G) lights from the incident light 5601 projected by way of the TIR prism 5311, and directs the light to the blue color-use spatial light modulators 5100 and green color-use spatial light modulators 5100, and further carries out the function of directing the reflection light 5602 of the green light and blue light to the TIR prism 5311.

Therefore, these three spatial light modulators 5100 carry out the spatial light modulations of these three colors, R, G and B simultaneously. The reflection light 5602, resulting from the respective modulations, is projected onto the screen 5900 as the projection light 5603 by way of the projection optical system 5400, and thus a color display is carried out.

Note that the system may implement various modifications by using a light separation/synthesis optical system instead of the light separation/synthesis optical system 5310 described above.

Figure 7A:
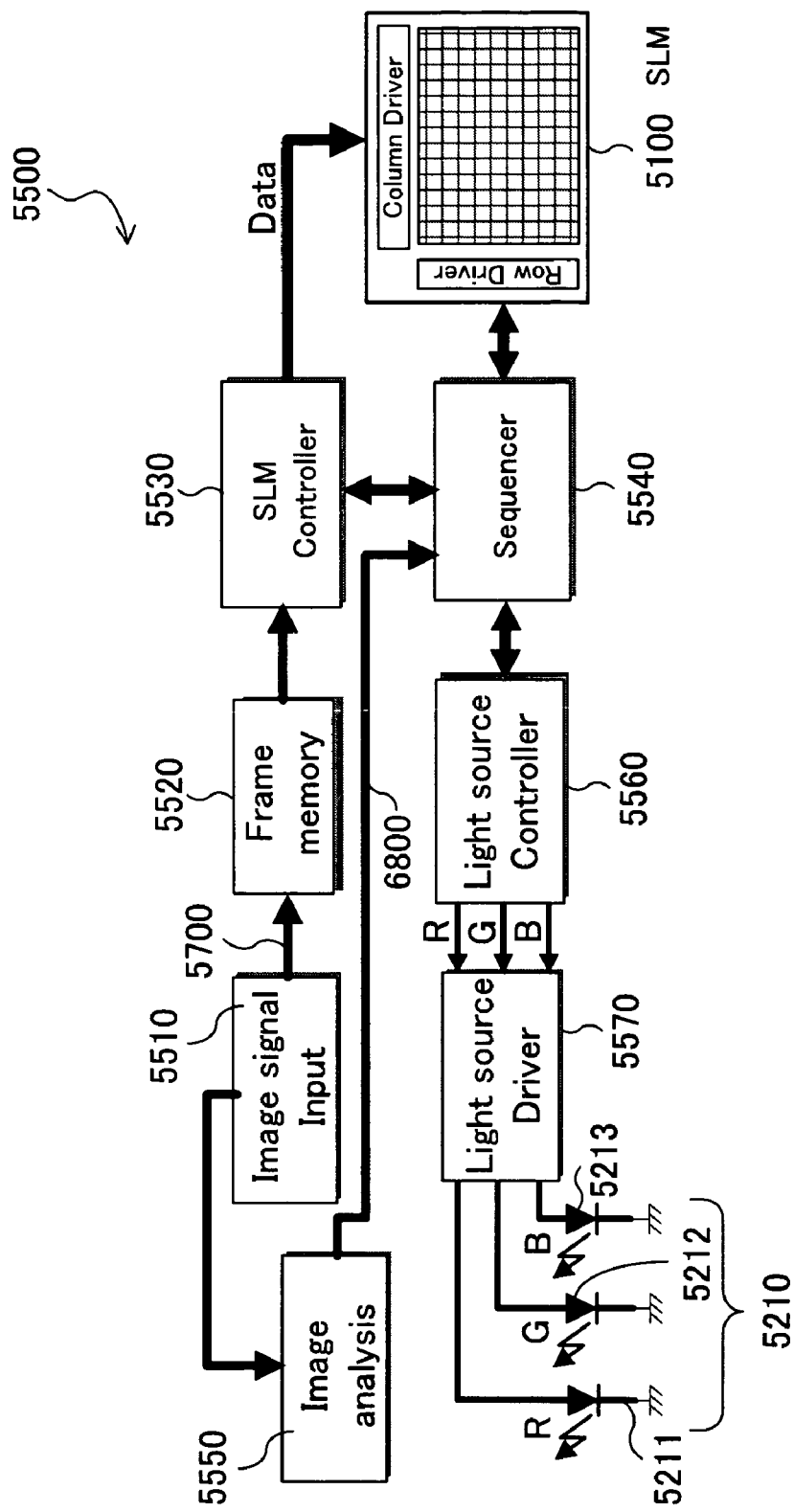
FIG. 7A is a functional block diagram showing the configuration of the control unit comprised in a single-panel projection apparatus according to a preferred embodiment of the present invention.

FIG. 7A is a functional block diagram for showing a configuration of the control unit 5500 implemented in the above described single-panel projection apparatus 5010. The control unit 5500 comprises a frame memory 5520, an SLM controller 5530, a sequencer 5540, a light source control unit 5560 and a light source drive circuit 5570.

The sequencer 5540, includes a microprocessor to control the operation timing of the entire control unit 5500 and the spatial light modulators 5100.

In one exemplary embodiment, the frame memory 5520 retains one frame of input digital video data 5700 received from an external device (not shown in the figure) connected to a video signal input unit 5510. The input digital video data 5700 is updated in real time whenever the display of one frame is completed.

The SLM controller 5530 processes the input digital video data 5700 read from the frame memory 5520, as described later. The SLM controller separates the data, read from the memory 5520, into a plurality of sub-fields according to detailed descriptions further describe below. The SLM controller outputs the data subdivided into subfields to the spatial light modulators 5100 as binary data 5704 and non-binary data 5705, which are used for implementing an the ON/OFF control and oscillation control (which are described later) of a mirror 5112 of the spatial light modulator 5100.

The sequencer 5540 outputs a timing signal to the spatial light modulators 5100 in sync with the generation of the binary data 5704 and non-binary data 5705 at the SLM controller 5530.

The video image analysis unit 5550 outputs a image analysis signal 5800 used for generating various light source pulse patterns (which are described later) corresponding to the input digital video data 5700 inputted from the video signal input unit 5510.

The light source control unit 5560 controls the light source drive circuit 5570 to control the operation of the variable light source 5210 by using a light source profile control signal in emitting the illumination light 5600. The light source profile control signal is generated from the image analysis signal 5800 on the basis of the input of the image analysis signal 5800 generated by the video image analysis unit 5550 using data of the light source pulse patterns generated by the sequencer 5540, as will be further described below.

The light source drive circuit 5570 drives the red 5211, green 5212 and blue 5213 laser light sources of the variable light source 5210 to emit light to generate the respective light source pulse patterns 5801 through 5812 (which are described later) that are inputted from the light source control unit 5560. Note that the present exemplary embodiment is configured with a laser light source. The light source of the projection apparatus may also be implemented with a semiconductor light source arraying light emitting diodes (LEDs).

Furthermore, as shown in FIG. 7A, a single light source drive circuit 5570 is arbitrarily selected and implemented as an optional configuration to drive the laser light sources of the respective colors. An alternative configuration may include independent light source drive circuits respectively corresponding to the red 5211, green 5212 and blue 5213 laser light sources of the respective colors red (R), green (G) and blue (B).

Further, the exemplary configuration here has shown the case of the variable light source 5210 being constituted by the red 5211, green 5212, and blue 5213 laser light sources; such a configuration is arbitrary. An alternative configuration may be such that the variable light source 5210 is constituted by a single light source capable of emitting light containing all wave lengths corresponding to, at least, the colors red (R), green (G) and blue (B).

Figure 7B:
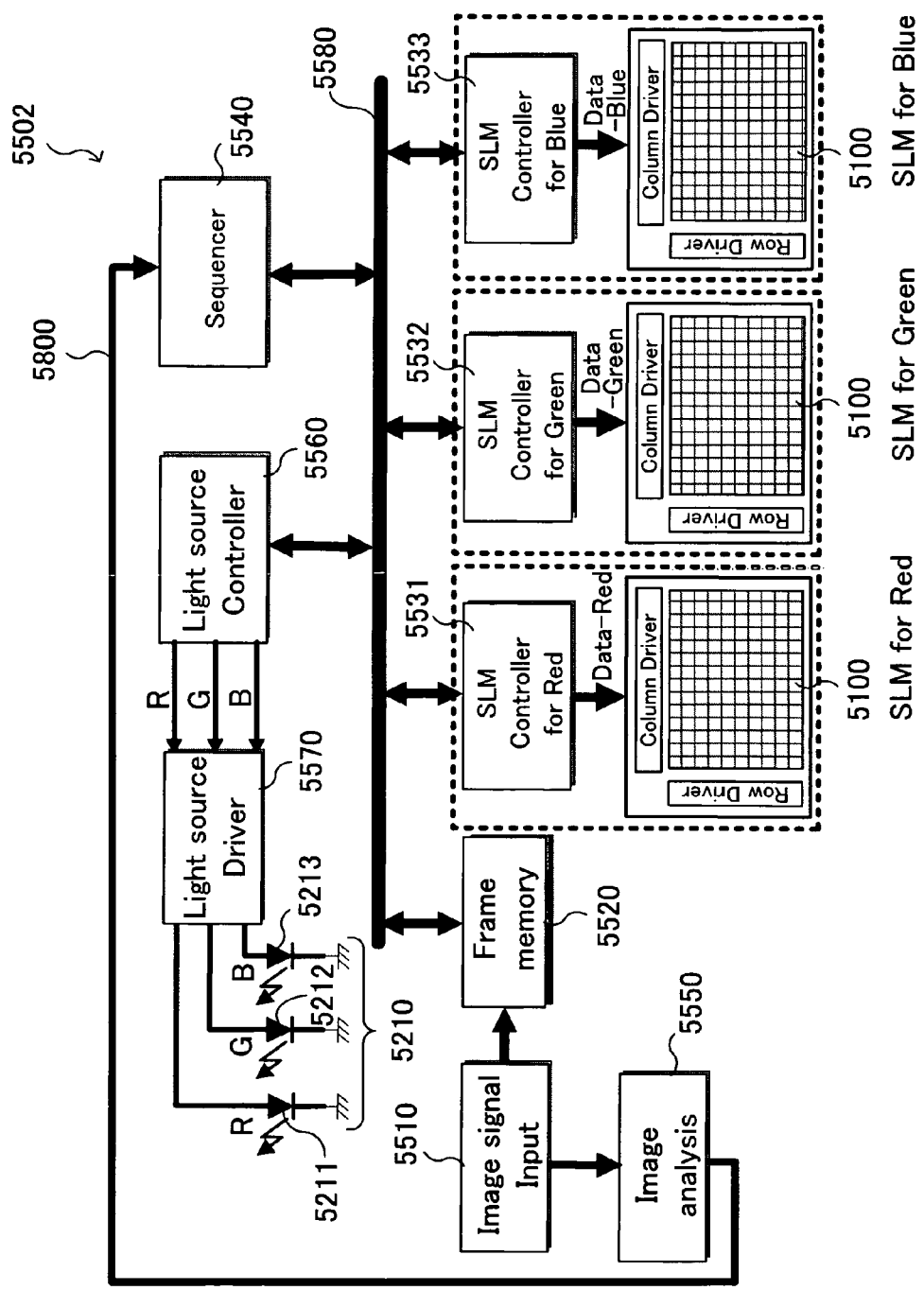
FIG. 7B is a functional block diagram showing the configuration the control unit comprised in a multi-panel projection apparatus according to a preferred embodiment of the present invention.

FIG. 7B is a functional block diagram for illustrating the configuration of a control unit 5502 comprised in a multi-panel projection apparatus according to the present embodiment.

The control unit 5502 comprises a plurality of SLM controllers 5531, 5532 and 5533, which are used for controlling each of the spatial light modulators 5100. Each of these modulators is implemented for modulating the respective colors R, G and B, and the configuration of the controllers is the main difference between the control unit 5502 and the control unit 5500 described in FIG. 8A.

Specifically, each of the SLM controller 5531, SLM controller 5532 and SLM controller 5533, is implemented to process the modulation of a specific color, Red, Green, and Blue. Each modulator is supported on the same substrate as those of the other spatial light modulators 5100. This configuration makes it possible to place the individual spatial light modulators 5100 and the corresponding SLM controller 5531, SLM controller 5532 and SLM controller 5533 close to each other, thereby enabling a high speed data transfer rate.

Furthermore, a system bus 5580 is used to connect the frame memory 5520, light source control unit 5560, sequencer 5540 and SLM controllers 5531 through 5533, in order to speed up and simplify the connection path of each connecting element.

The example of a single light source drive circuit 5570 driving the laser light sources of each color, as described above, is selected arbitrarily as an exemplary embodiment. An alternative configuration may include independent light source drive circuits respectively corresponding to the red 5211, green 5212 and blue 5213 laser light sources of the respective colors red (R), green (G) and blue (B).

Also, the exemplary configuration here has shown the case of the variable light source 5210 being constituted by the red 5211, green 5212 and blue 5213 laser light sources; such a configuration is arbitrary. An alternative configuration may be such that the variable light source 5210 is constituted by a single light source capable of emitting light containing all wave lengths corresponding to, at least, the colors red (R), green (G) and blue (B).

Furthermore, the exemplary configuration as shown has illustrated the case of implementing the multiple spatial light modulators 5100 with the respective SLM controllers 5530; an alternative configuration may control the multiple spatial light modulators 5100 with a common SLM controller.

Figure 8A:
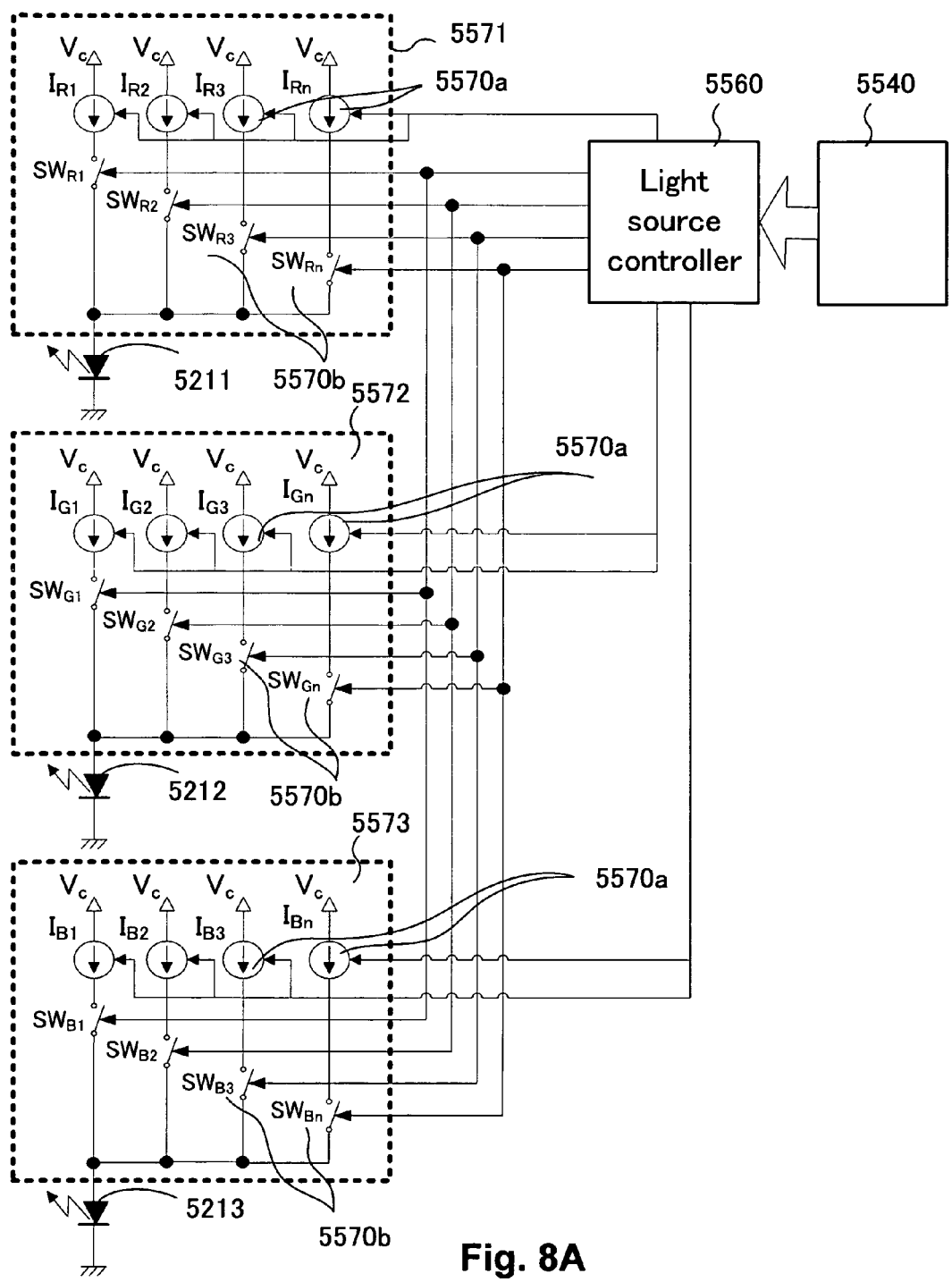
FIG. 8A is a functional block diagram showing the configuration of the light source drive circuit of a projection apparatus according to a preferred embodiment of the present invention.

FIG. 8A is a block diagram for showing the configuration of the light source drive circuit 5570 (i.e., the light source drive circuits 5571, 5572 and 5573) according to the present embodiment. The light source drive circuit shown in FIG. 8A includes a plurality of constant-current circuits 5570$a$ (i.e., I (R, G, B)$_1$ through I (R, G, B)$_n$) and a plurality of switching circuits 5570b (i.e., switching circuits SW (R, G, B)$_1$ through SW (R, G, B)$_n$), corresponding to the respective constant current circuits 5570a, in order to generate the desired light intensities. The light emissions are shown as P$_1$ through P$_n$ for the light source optical system 5200 (i.e., the red 5211, green 5212 and blue 5213 laser light sources).

The switching circuit 5570b carries out a switching in accordance with a desired emission profile of the variable light source 5210 (i.e., the red 5211, green 5212 and blue 5213 laser light source).

The setup values of the output current of the constant current circuits 5570a (i.e., constant current circuits I (R, G, B)$_n$), when the gray scale of the emission intensity of the variable light source 5210 is designated at N bits (where N≧n), are as follows:

$$I(R, G, B)_1 = I_{th} + LSB$$
$$I(R, G, B)_2 = LSB + 1$$
$$I(R, G, B)_3 = LSB + 2$$
$$...$$
$$...$$
$$I(R, G, B)_n = MSB$$

In this exemplary embodiment, a gray scale display is controlled on the basis of the emission intensity. A similar gray scale display is achievable even if the emission period (i.e., an emission pulse width) and the emission interval (i.e., an emission cycle) are variable.

The relationship between the emission intensity Pn of the variable light source and drive current for each color in this case is as follows. Note that "k" is an emission efficiency corresponding to the drive current:

$$P_1 = k*(I_{th} + I_1)$$
$$P_2 = k*(I_{th} + I_1 + I_2)$$
$$...$$
$$...$$
$$P_n = k*(I_{th} + I_1 + I_2 + ... + I_{n-1} + I_n)$$

Figure 8B:
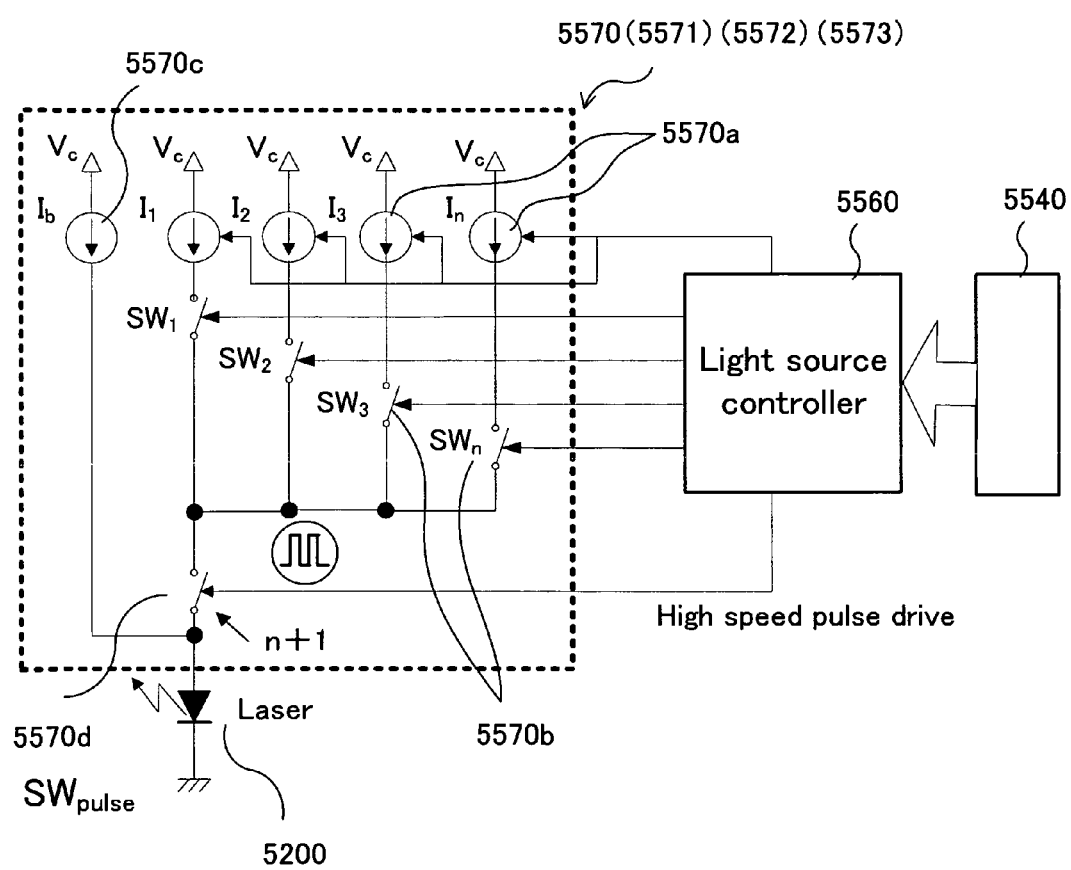
FIG. 8B is a functional block diagram showing an exemplary modification of the configuration of the light source drive circuit of a projection apparatus according to a preferred embodiment of the present invention.

FIG. 8B is a block diagram for showing an exemplary modification of the configuration of the light source drive circuit according to the present embodiment.

For simplicity, FIG. 8B denotes the constant current circuits 5570a (I (R, G, B)$_1$ through I (R, G, B)$_n$) as constant current circuits 5570a (I$_1$ through I$_n$) and the switching circuits 5570b (SW (R, G, B)$_1$ through SW (R, G, B)$_n$) as switching circuits 5570b (SW$_1$ through SW$_n$).

As described later, the light source drive circuits 5570 according to the present embodiment is configured to control the individual constant current circuit 5570a (i.e., I (R, G, B)$_1$ in this case) to supply a current equivalent to the threshold current I$_{th}$ of the light source optical system 5200. Alternately, the individual constant current circuit supplies a current close to the aforementioned threshold current, as a bias current I$_b$ when a semiconductor laser or a similar light source is used as the light source optical system 5200. By using a high-speed current drive, the respective switching operation of the light source drive circuits 5570 is stabilized to provide a high-speed emission.

The light source drive circuits 5570 (i.e., the light source drive circuits 5571, 5572, and 5573) shown in FIG. 9B comprises bias current circuits 5570c, which are continuously connected to the light source optical systems 5200 (i.e., the red 5211, green 5212 and blue 5213 laser light source) and which are used for applying a bias current I$_b$, in addition to the constant current circuits 5570a.

Further, the connection of the constant current circuits 5570a to the light source optical systems 5200 is configured through a switching circuit 5570d (SW$_{pulse}$) included on the downstream side of the switching circuits 5570b.

As shown in FIG. 8B, the relationship between the emission intensity P$_n$ and drive current of the variable light source for each wavelength is as follows, where "k" is the emission efficiency in terms of drive current:

$$P_b = k*I_b (I_b \approx I_{th})$$
$$P_1 = k*(I_{th} + I_1)$$
$$P_2 = k*(I_{th} + I_1 + I_2)$$
$$...$$
$$...$$
$$P_n = k*(I_{th} + I_1 + I_2 + ... + I_{n-1} + I_n)$$

That is, the relationship between each switching operation and emission output is as follows:

$$SW_{pulse} = \text{OFF}: P_b = k*I_b \approx 0 \text{ [mW] (where } I_b \approx I_{th})$$
$$SW_1: P_1 = k*(I_b + I_1)$$
$$SW_2: P_2 = k*(I_b + I_1 + I_2)$$
$$...$$
$$...$$
$$SW_n: P_n = k*(I_b + I_1 + I_2 + ... I_{n-1} + I_n)$$

Figure 21:
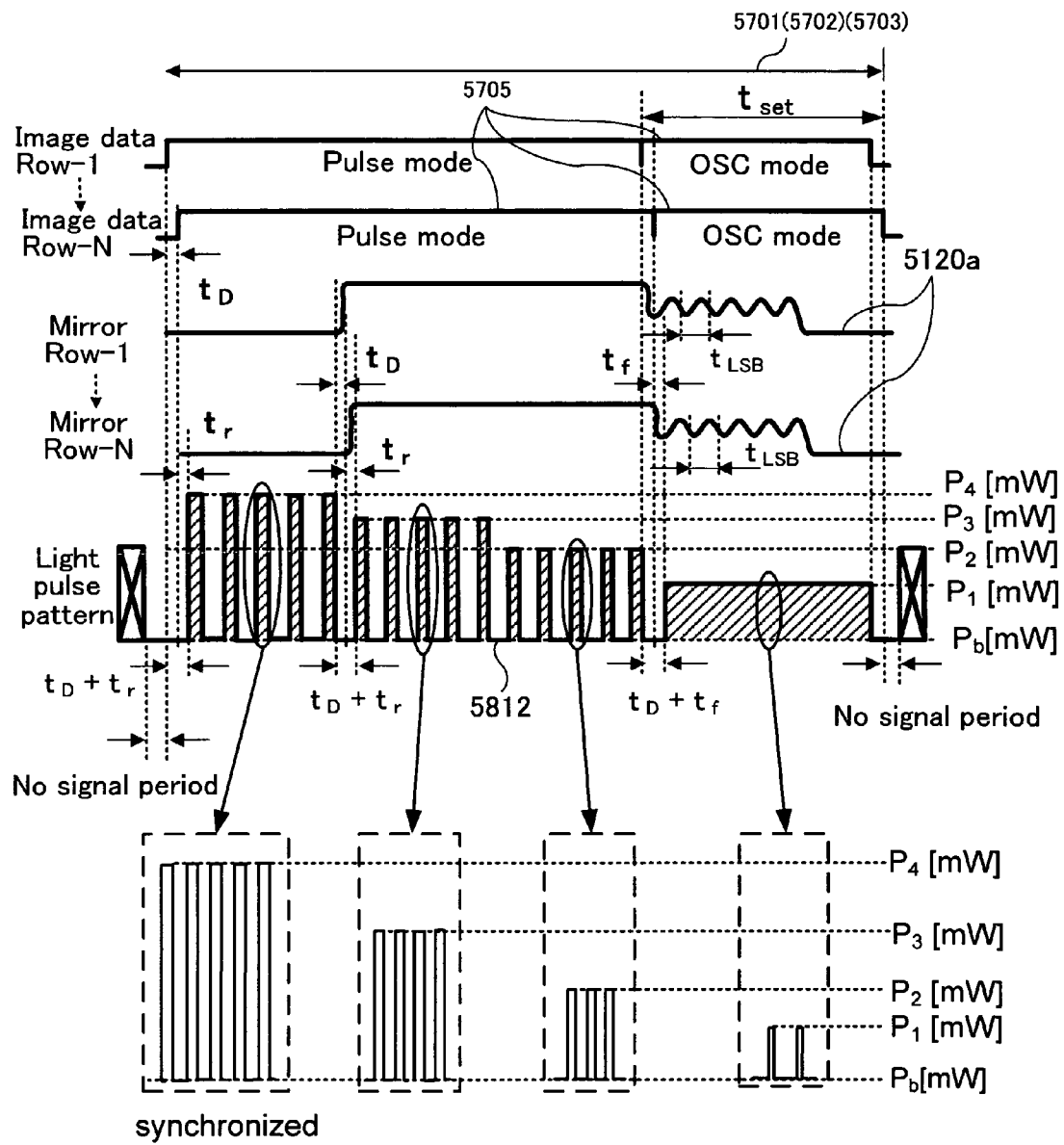
FIG. 21 is a chart illustrating an exemplary modification of the control scheme of a spatial light modulator using non-binary data in a preferred embodiment of the present invention.

This configuration as shown can generate an emission profile with a nearly zero emission light intensity P$_b$ as shown in FIG. 21 (which is described later).

FIG. 8B shows an embodiment wherein the switching circuits 5570d can carry out a circuit operation unaffected by a drive current switching over, that may be controlled by the switching circuits 5570b (SW$_1$ through SW$_n$). Each of the switching circuits 5570b is connected to the respective constant current circuits 5570a. Particularly, a further function is carried out in that when the variable light source 5210 is not emitting light, the above-described switching circuits (SW$_1$ through SW$_n$) are switched over.

While the bias current value is designated at a fixed current value in the configuration of FIG. 8B, it is also possible to connect the bias current circuit 5570c to the light source control unit 5560 and allow a variable bias current.

Figure 9:
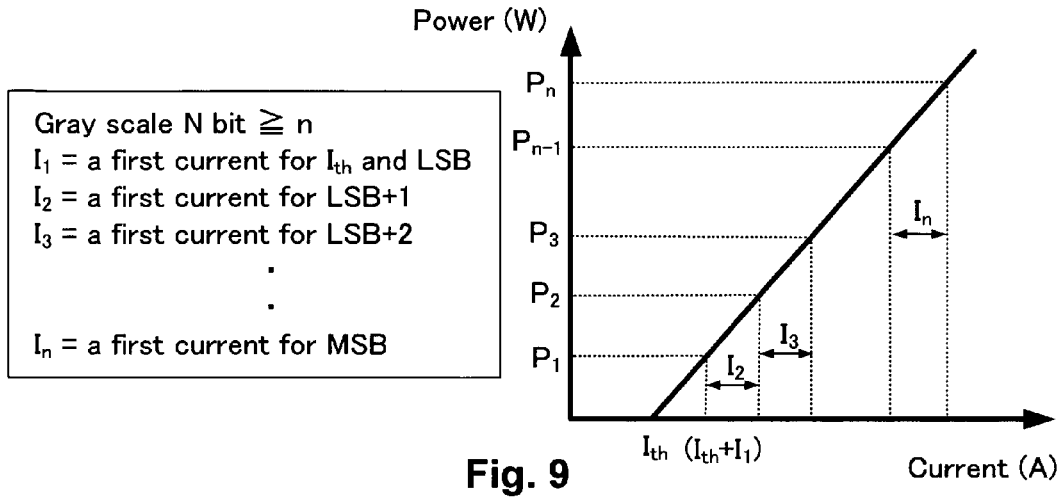
FIG. 9 is a diagram showing the relationship between the applied current and the intensity of emission of the light source drive circuit according to a preferred embodiment of the present invention.

FIG. 9 is a diagram for showing the relationship between the applied current I of the constant current circuit 5570a of the light source drive circuit shown in the above described FIG. 8A and the emission intensity P$_n$.

Figure 10:
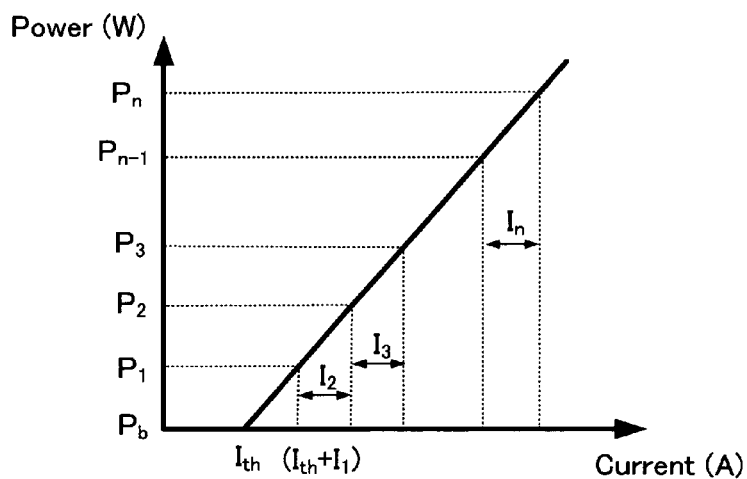
FIG. 10 is a diagram showing the relationship between the applied current and the intensity of emission of the constant current circuit of the light source drive circuit according to a preferred embodiment of the present invention.

FIG. 10 is a diagram for showing the relationship between the applied current I of the constant current circuit 5570a of the light source drive circuit shown in the above described FIG. 8B and emission intensity P$_b$, emission intensity P$_n$.

Note that the descriptions for FIGS. 8A and 8B have been provided for the case of changing the emission profiles of the variable light source for each sub-frame corresponding to each gray scale bit. If the display gray scale function of the spatial light modulator 5100 is used in parallel, the number of required levels of electrical current decreases, thus reducing the number of constant current circuits 5570a and also the number of the switching circuits 5570b. It is therefore possible to obtain the number of gray scales equal to, or higher than, the gray scales achievable through the modulation process of the spatial light modulator 5100.

The following detail description is for an exemplary configuration of the spatial light modulator 5100 according to the present embodiment.

The spatial light modulator 5100 according to the present embodiment is a deflectable mirror device that arranges a plurality of mirror elements in a two-dimensional array.

Figure 11:
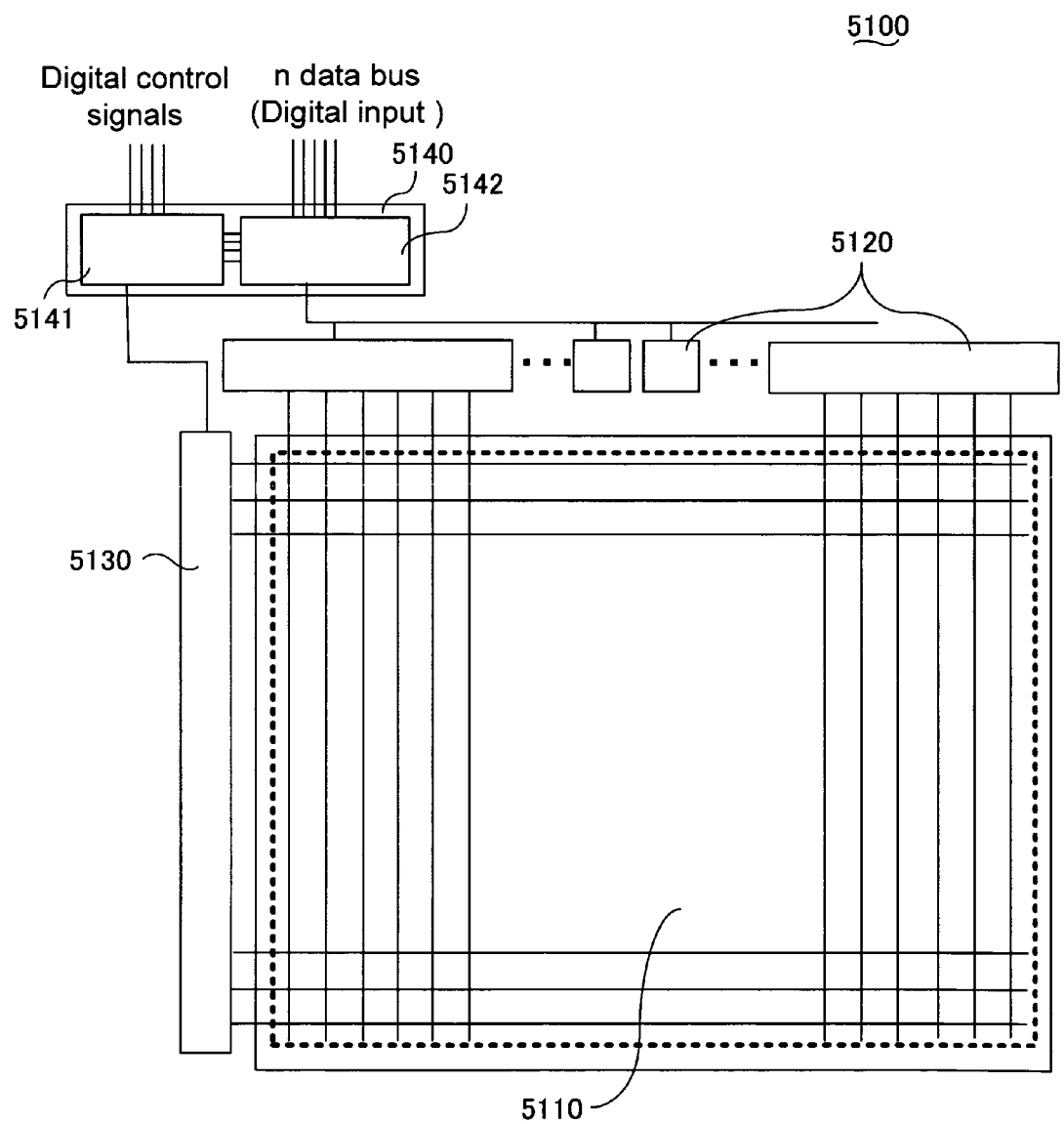
FIG. 11 is a functional block diagram showing the layout of the internal configuration of a spatial light modulator according to a preferred embodiment of the present invention.

FIG. 11 is a circuit schematic diagram for illustrating the layout of the internal configuration of the spatial light modulator 5100 according to the present embodiment.

Figure 12:
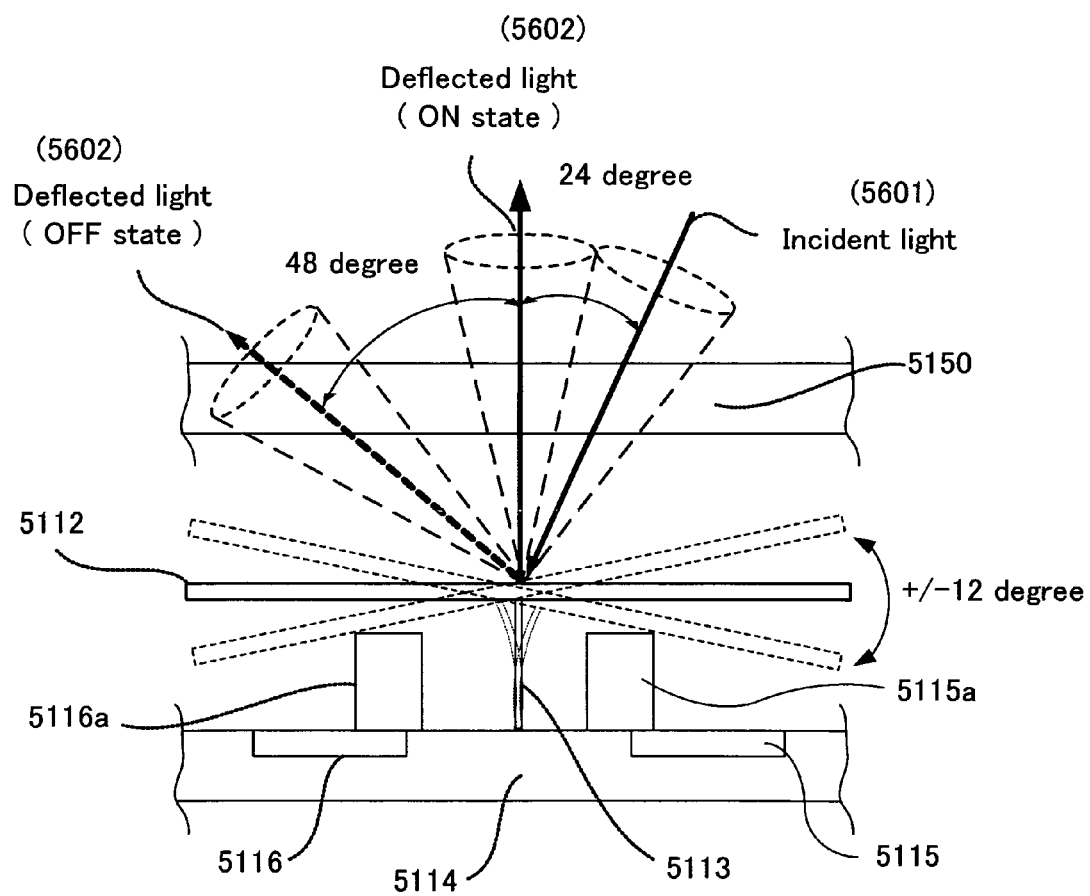
FIG. 12 is a cross-sectional diagram of an individual pixel unit constituting a spatial light modulator according to a preferred embodiment of the present invention.
Figure 13:
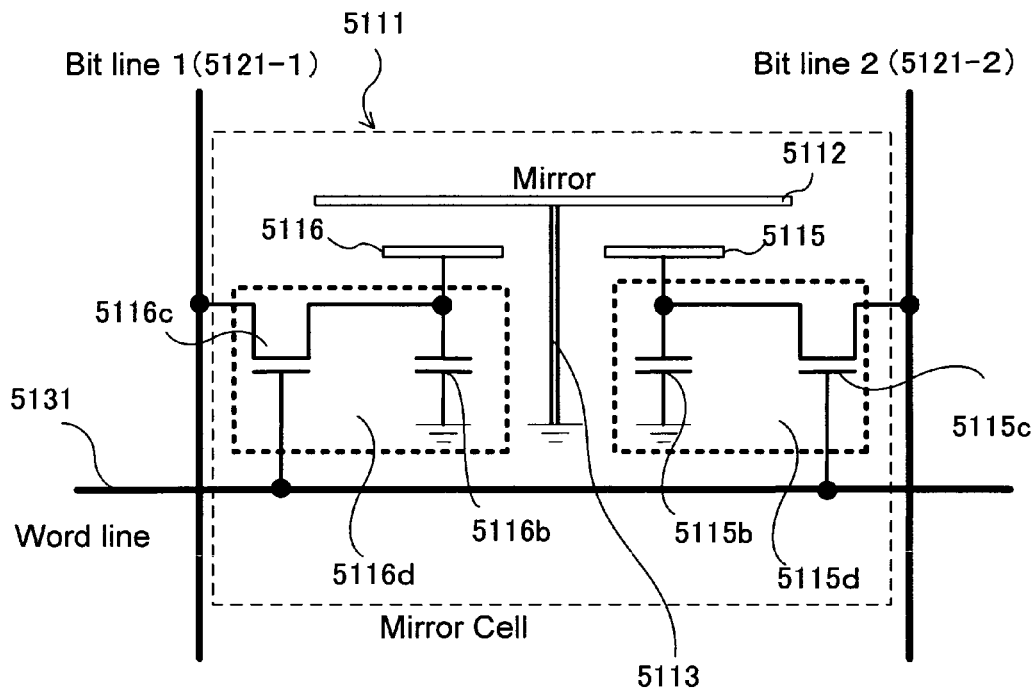
FIG. 13 is a functional block diagram showing the configuration of an individual pixel unit constituting a spatial light modulator according to a preferred embodiment of the present invention.

FIG. 12 is a cross-sectional diagram of an individual pixel unit constituting the spatial light modulator 5100 according to the present embodiment. FIG. 13 is a side cross sectional view for showing the configuration of an individual pixel unit implemented in the spatial light modulator 5100 according to the present embodiment.

FIG. 11 shows an exemplary embodiment of a spatial light modulator 5100 that includes a mirror element array 5110, column drivers 5120, ROW line decoders 5130 and an external interface unit 5140.

The external interface unit 5140 comprises a timing controller 5141 and a selector 5142. The timing controller 5141 controls the ROW line decoder 5130 on the basis of a timing signal from the SLM controller 5530. The selector 5142 supplies the column driver 5120 with digital signal incoming from the SLM controller 5530.

In the mirror element array 5110, a plurality of mirror elements are arrayed at the positions where individual bit lines 5121 vertically extended from the column drivers 5120, crosses over the individual word lines 5131 horizontally extended from the ROW line decoders 5130.

As exemplified in FIG. 12, the individual mirror element 5111 includes a freely deflectable mirror 5112 supported on a substrate 5114 by way of a hinge 5113. The mirror 5112 is covered with a cover glass 5150 for protection.

The mirror further includes an OFF electrode 5116 (and an OFF stopper 5116a) and an ON electrode 5115 (and an ON stopper 5115a). The electrodes and stoppers are symmetrically placed across the hinge 5113 on the substrate 5114.

The OFF electrode 5116 attracts the mirror 5112 with a coulomb force by the application of a predetermined voltage and tilts the mirror 5112 to a position of contact with the OFF stopper 5116a. This causes the incident light 5601 incident to the mirror 5112 to reflect in a light path along an OFF direction away from the optical axis of the projection optical system 5400.

The ON electrode 5115 draws the mirror 5112 with a coulomb force by applying a predetermined voltage and tilts the mirror 5112 to a position of contact with the ON stopper 5115a. This causes the incident light 5601, incident to the mirror 5112, to be reflected in a light path along the ON direction, to align with the optical axis of the projection optical system 5400.

Figure 14:
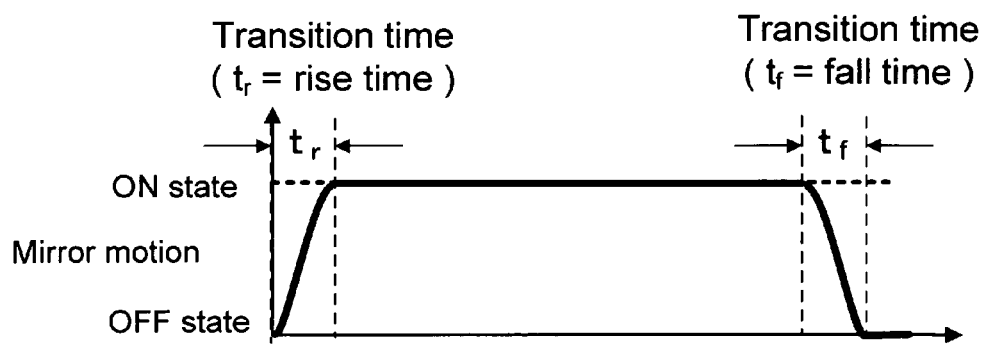
FIG. 14 is a diagram showing the transition between the ON state and OFF state of a mirror in a spatial light modulator according to a preferred embodiment of the present invention.

FIG. 14 is a timing diagram for showing a transition response between the ON and OFF state of the mirror 5112. In the transition from the OFF state, in which the mirror is attracted by the OFF electrode 5116 and contacts the OFF stopper 5116a, to the ON state, in which the mirror is attracted by the ON electrode 5115 and contacts the ON stopper 5115a, a rise time $t_r$ is required before the transition to a complete ON state is reached. Likewise a fall time $t_f$ is required before the transition to a complete OFF state is reached.

The reflection light 5602 is in the transition state in the period between the rise time $t_r$ and the fall time $t_f$. By applying an ON/OFF dual-states control, the light emitted in the transition state generates a light processed by the control system as an uncontrollable interference in controlling a grayscale display. Therefore, the present embodiment is configured to carry out such a control so as to suppress the emission of the variable light source 5210, as described later, thereby eliminating a use of the reflection light 5602 in the transition state.

Next is a description of an example operation of a projection apparatus according to the present embodiment.

Digital video data input 5700 inputted to a video signal input unit 5510 from outside is outputted to a frame memory 5520 and to a video image analysis unit 5550.

An SLM controller 5530 reads the digital video data 5700 received from the frame memory 5520. The controller 5530 converts the digital video data into binary data 5704. The binary data 5704 is pulse width-modulated, or converted into non-binary data 5705 then transmitted as a control signal to a column driver 5120, by way of an external interface unit 5140. The control signal is applied by the spatial light modulator 5100 to control the ON/OFF or oscillation of the mirror 5112.

The pulse width-modulated binary data 5704 is processed to generate a pulse width in accordance with the weighting value of each bit depending on the relative position of the bit in the control word.

The non binary data 5705 converted from the digital video data 5700 becomes a bit string that includes continuous bits of "1" corresponding to the level of brightness, and in this bit stream each bit of the non-binary data 5705 has the same weighting factor (e.g., "1").

Furthermore, a sequencer 5540 outputs a synchronous signal, such as VSYNC, which is output from the SLM controller 5530 synchronously with the digital video data input 5700, to the ROW line decoder 5130 of the spatial light modulator 5100.

In this configuration, the displaying/updating of one screen (i.e., one frame) is carried out by the ROW line decoder 5130 for synchronously controlling the ON/OFF or oscillation state of the mirror elements 5111 in one ROW along the word line 5131 of the micromirror 5112.

Figure 15A:
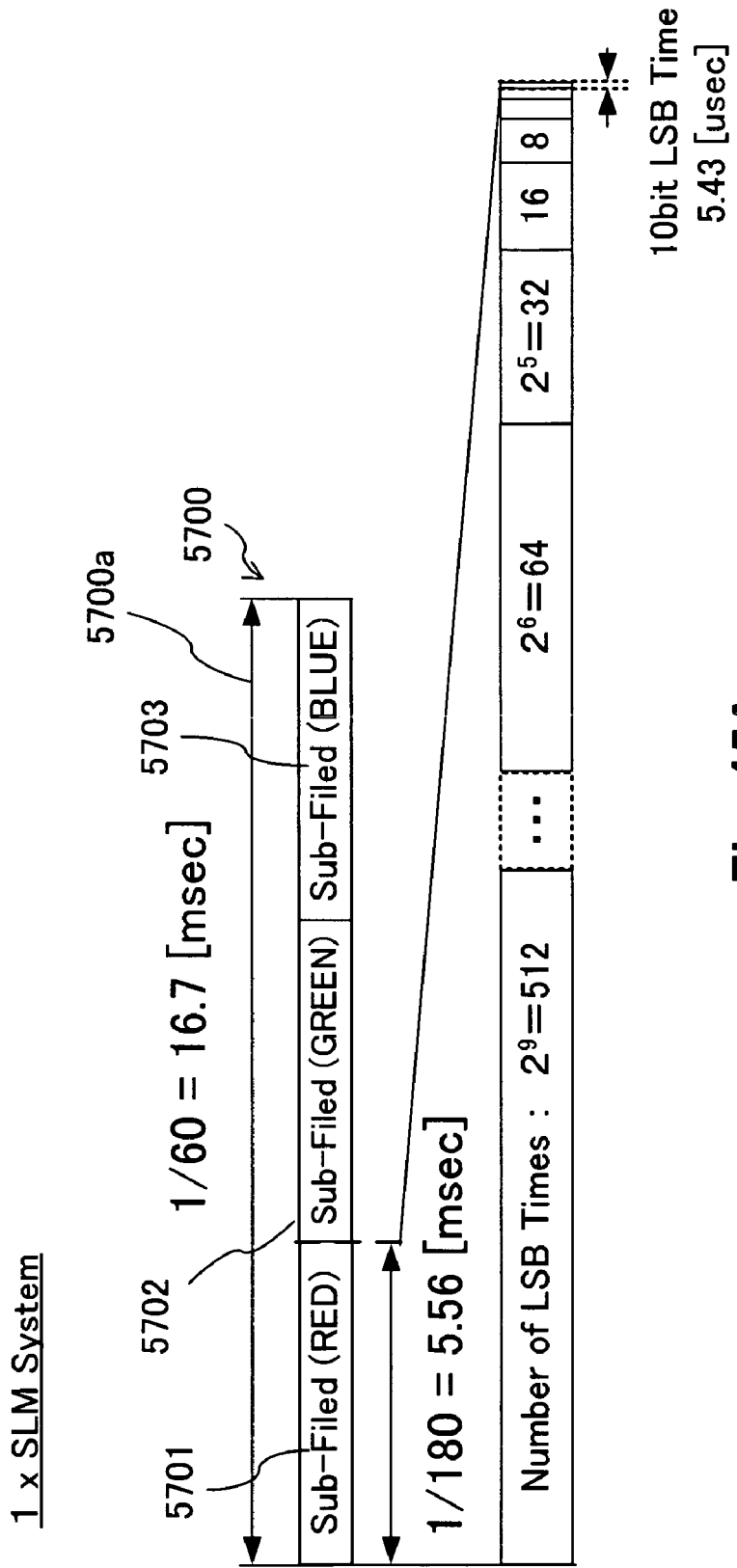
FIG. 15A is a set of data field diagrams showing the data structure of image data used in a preferred embodiment of the present invention.

Note that, in the case of carrying out a color display in a color sequence method using the single-panel projection apparatus (comprising one SLM) 5010 that is illustrated in the above described FIG. 5, one frame (i.e., a frame 5700-1) of the digital video data input 5700 comprises a plurality of subfields, i.e., the subfield 5701, subfield 5702 and subfield 5703, which are aligned in a time series corresponding to their respective colors R, G and B, as illustrated on the upper portion of FIG. 15A. The above described binary data 5704 or non-binary data 5705, or mixed data (not shown in a drawing) obtained by combining these pieces of data, is generated for each of the aforementioned subfields.

Figure 15B:
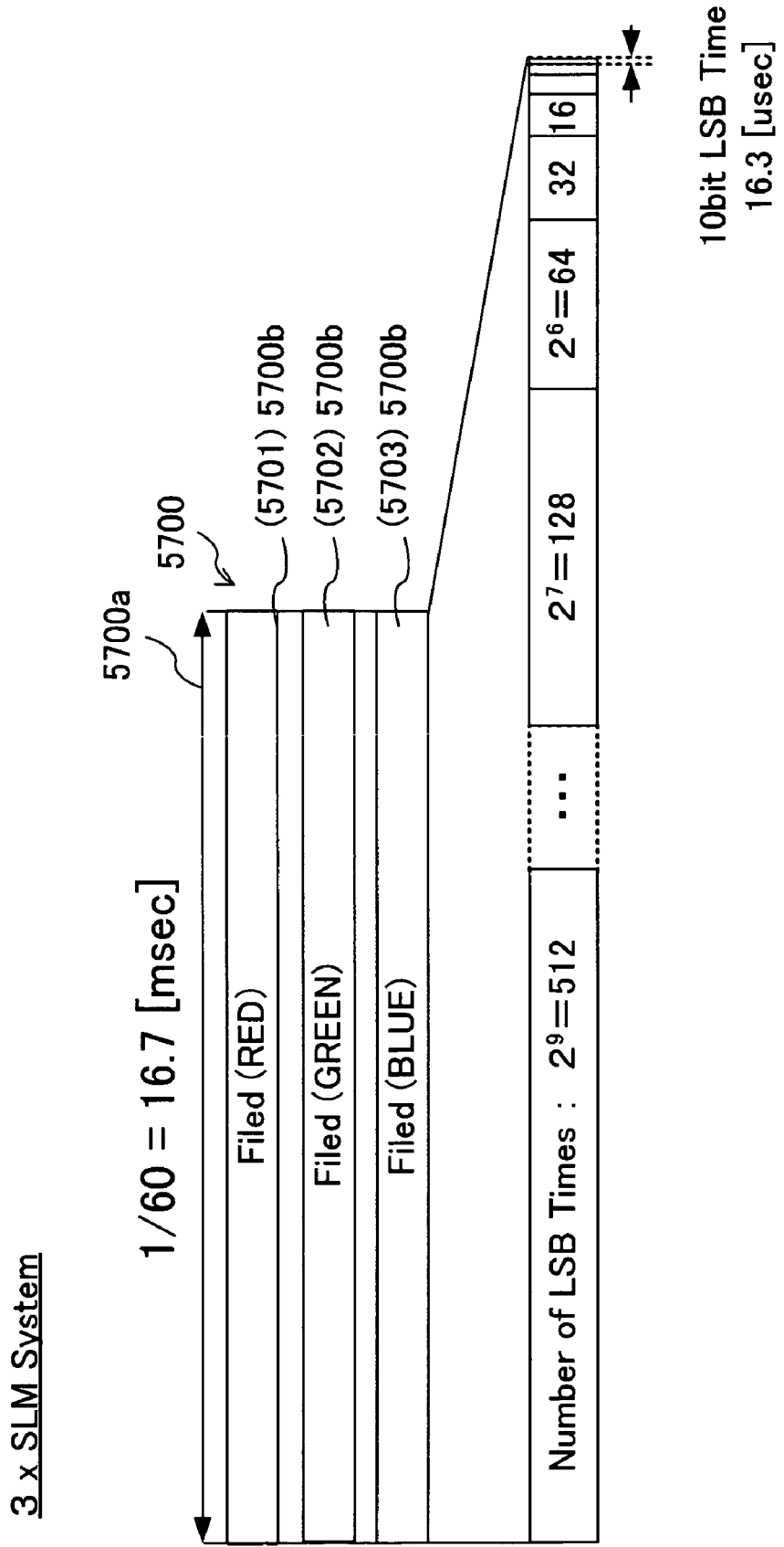
FIG. 15B is a set of data field diagrams showing the data structure of image data used in a preferred embodiment of the present invention.

At the same time, in the case of the above described multi-panel projection apparatuses (comprising three SLMs) 5020, 5030 and 5040, subfields 5700b (which are equivalent to subfields 5701, 5702 and 5703) corresponding to the respective colors R, G and B simultaneously output to the spatial light modulators 5100, as illustrated on the lower portion of FIG. 15B, and the spatial light modulations for the respective colors are simultaneously performed.

Also in this case, the above described binary data 5704 or non-binary data 5705 is generated for each field 5700b.

The present embodiment is configured such that the video image analysis unit 5550 of the control unit 5500 1) detects the timing of the change in signal waveforms of the binary data 5704 or non-binary data 5705 from the digital video data input 5700, 2) generates a video image analysis signal 5800 for controlling red laser light source 5211, green laser light source 5212, and blue laser light source 5213, of the variable light source 5210, and 3) inputs the generated signal to the light source control unit 5560 by way of the sequencer 5540.

This configuration implements the control for the variable light source 5210 operating synchronously with the timing of the change in signal waveforms of the binary data 5704 or non-binary data 5705 of the digital video data input 5700, as described later.

Figure 16:
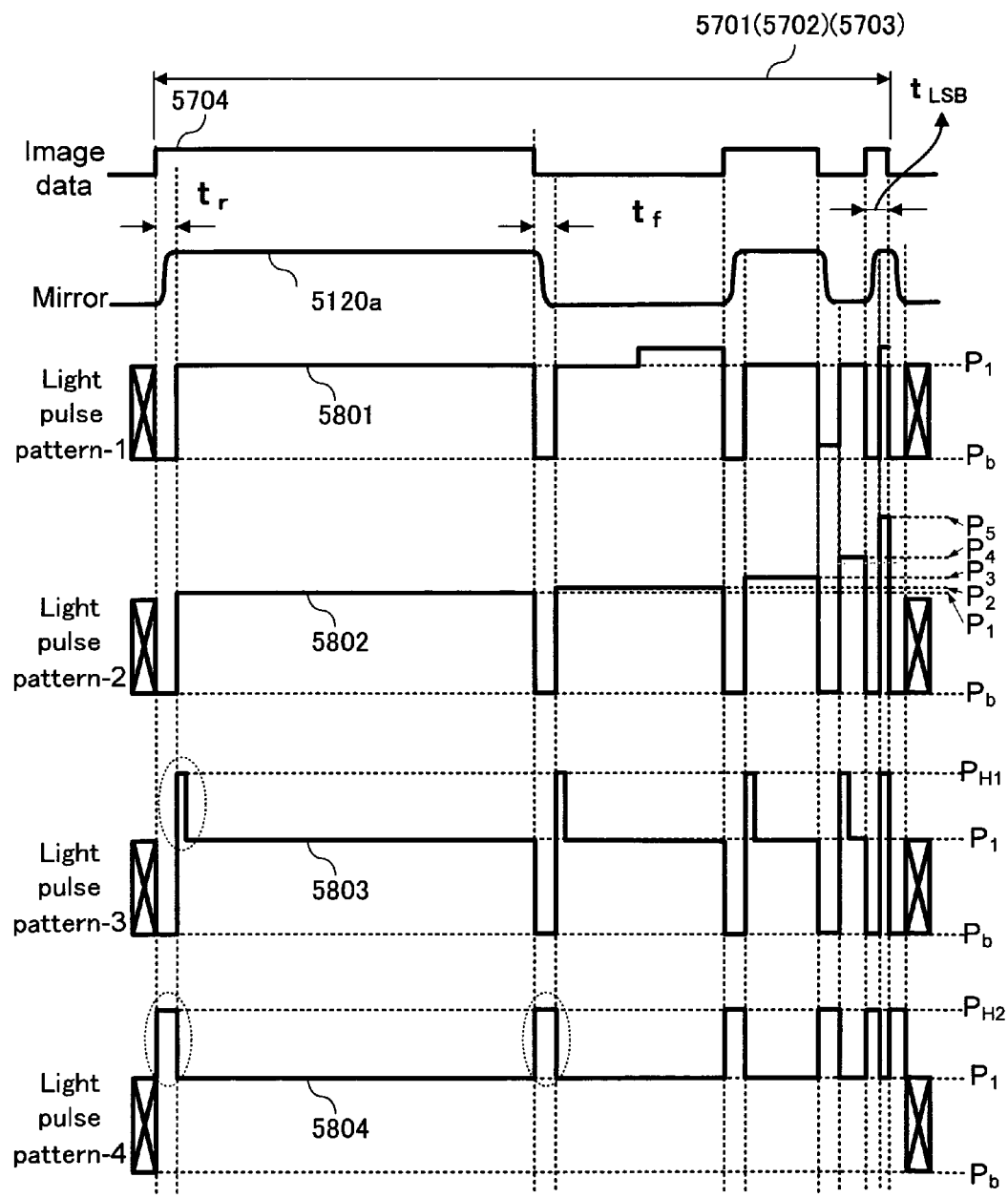
FIG. 16 is a timing diagram illustrating the setup of a light source pulse pattern in controlling a mirror by means of binary data in a projection apparatus according to a preferred embodiment of the present invention.
Figure 17:
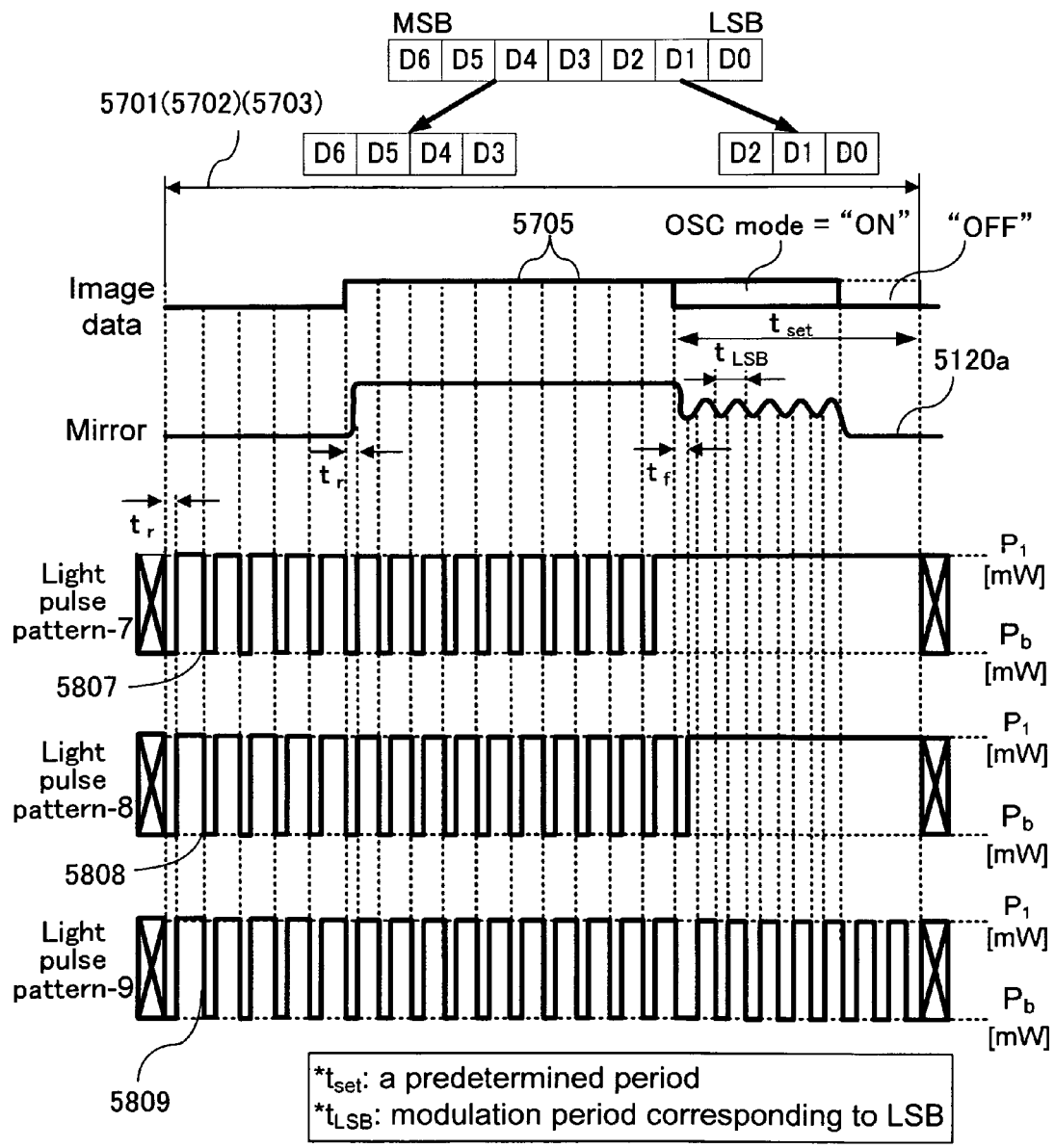
FIG. 17 is a timing diagram illustrating the setup of a light source pulse pattern in controlling a mirror by means of non-binary data in a projection apparatus according to a preferred embodiment of the present invention.

More specifically, as illustrated in FIGS. 16 and 17, the projection apparatus according to the present embodiment is configured such that the SLM controller 5530 controls the spatial light modulator 5100. At least two mirror elements (i.e., mirror elements 5111) perform a modulation corresponding to the least significant bit (LSB) within a predetermined period of one frame. Furthermore, the light source control unit 5560 (i.e., the video image analysis unit 5550) changes the emission profiles of the variable light source in a period equal to, or less than, the predetermined period and obtains the minimum grayscale output.

This emission profile shows the change of the emission state of the variable light source 5210, such as the emission intensity, emission period, emission pulse width, emission interval, and the number of emission pulses.

This configuration makes it possible 1) to control each mirror element 5111 so that the modulation controls corresponding to the LSB of all mirror elements in each group occur within a predetermined period of time when the mirror element array 5110 of a spatial light modulator 5100, or the mirror elements of the mirror element array 5110, are controlled by being divided into groups; and 2) to control the emission profile of the variable light source 5210 in high speed within the period in which the modulation states of the desired mirror elements match.

As a result, the projection apparatus of the present embodiment is able to achieve a grade of display grayscale in high precision, higher than that of the spatial light modulator 5100.

Note that when the light source control unit 5560 controls the emission profile of the variable light source 5210, it comprises a larger number of types of emission profiles than the number of display grayscale bits of the spatial light modulator 5100.

In the case of the present embodiment, when carrying out a gray scale display of binary image data by using sub-frames that have periods, which correspond to the weight of individual data bits for each frame by means of a pulse width modulation (PWM), the influence of the transition period of the modulation states is different for each frame. Furthermore, each sub-frame period is different according to the corresponding display grayscale bit as described above, and, therefore, the emission profile for each sub-frame is different. Additionally, when performing a grayscale display in excess of the display grayscale of the spatial light modulator 5100, the number of sub-frames will further increase.

FIG. 16 illustrates the control of the variable light source 5210 for controlling the spatial light modulator 5100 by means of binary data 5704.

According to the diagram, the ON/OFF state of the mirror 5112 changes, as indicated by a mirror modulation control waveform 5120a by tracing the waveform of the binary data 5704. The change in the rise and fall of the mirror modulation control waveform 5120a, however, is delayed by the amount of the rise time $t_r$ and fall time $t_f$, respectively, as relative to the binary data 5704.

The present embodiment is configured to control the variable light source 5210. The variable light source 5210 is turned on only for the period when the ON section of the binary data 5704 overlaps with the ON period of the mirror modulation control waveform 5120a, with the rise time $t_r$ and fall time $t_f$ reduced to at least an LSB-corresponding modulation period $t_{LSB}$, as indicated by the light source pulse patterns 5801, 5802 and 5803.

With this control scheme, the variable light source 5210 is turned off during the transition periods of the rise time $t_r$ in which the mirror 5112 shifts from the OFF to ON state and of the fall time $t_f$ in which the mirror 5112 shifts from the ON to OFF state. This configuration enables a higher gradation than the spatial light modulator 5100 by reducing, for example, an error factor in the LSB-corresponding modulation period $t_{LSB}$.

More specifically, in the case of the present embodiment, the light source control unit 5560 controls the variable light source 5210 so that the period is reduced in which the modulation states of the spatial light modulator 5100 shift, which influences the display image.

The spatial light modulator 5100 achieves the desired display gray scale by changing the voltages applied to the individual mirror elements 5111 and the deflection state of the mirror 5112 and the like.

The transitioning of the spatial light modulator 5100 between the respective modulation states has been a limiting factor in the accuracy (e.g., resolution and linearity) of the display gray scale of the spatial light modulator 5100 and its minimum display gray scale.

In consideration of this limitation, the present embodiment aims to improve the accuracy of the display gray scale by 1) using a variable light source 5210 capable of being controlled at a higher speed than the modulation state transition period of the spatial light modulator 5100 and 2) changing the emission profiles of the variable light source 5210 at high speed during the state transition period, thereby improving the display gray scale accuracy in a projection apparatus and producing a high gradation display.

The light source pulse pattern 5801 illustrates the controlling of the variable light source 5210 so as to switch between the OFF state, with the constant emission intensity $P_b$, and the ON state, with the constant emission intensity $P_1$.

Furthermore, the light source pulse pattern 5802 illustrates the controlling of the emission intensity of the variable light source 5210 during the turn-on period so that the emission intensity gradually increases from an emission intensity $P_1$ (corresponding to the MSB) to an emission intensity $P_2$, to an emission intensity $P_3$, to an emission intensity $P_4$, to an emission intensity $P_5$ (corresponding to the LSB), corresponding to the pulse widths of the binary data 5704 for which the turn-on period gradually decreases from the MSB toward the LSB, depending on the weights of the respective bits.

Additionally, the light source pulse pattern 5803 illustrates performing a control so as to compensate for a light volume loss during the period the emission is suppressed in one rise time $t_r$ by locally adding the pulse of an emission intensity $P_{h1}$ that is larger than the emission intensity $P_1$ immediately after the rise time $t_r$ of the mirror modulation control waveform 5120a.

Furthermore, the light source pulse pattern 5804 illustrates the compensation for a light volume loss in the period of one rise time $t_r$ by adding two pulses of emission intensity $P_{h2}$.

These controls can be implemented by selectively turning ON in the above described switching circuit 5570b.

The light source pulse pattern 5802 makes it possible 1) to compensate for the decrease in emission intensity due to a turn-off period of a rise time $t_r$ and fall time $t_f$ on the LSB side, in which the pulse width is small and the effect of rise time $t_r$ and fall time $t_f$ increases, and 2) to improve the accuracy of the display gray scale.

Figure 18:
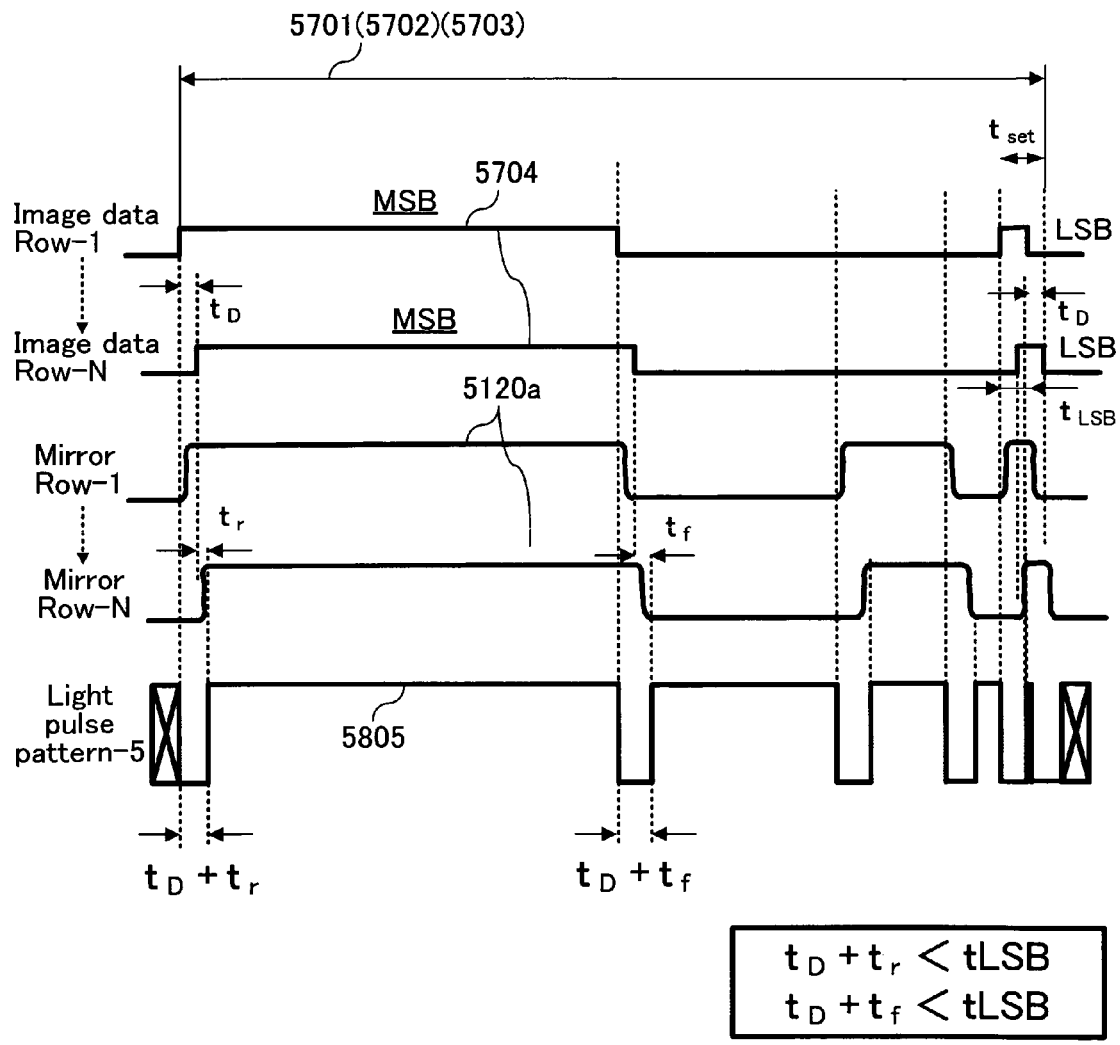
FIG. 18 is a timing diagram illustrating the setup of a light source pulse pattern in controlling a mirror by means of binary data in a projection apparatus according to a preferred embodiment of the present invention.

Considering the N rows of the mirror element array 5110 corresponding to the N lines of horizontal scan lines, as illustrated in FIG. 18, there exists a difference between the first row (Row-1) and the last row (Row-N) in the delay time $t_D$ of the control start times of the mirror modulation control waveform 5120a.

For such a case, a circuit connection is accordingly configured, so that the turn-on timing is shifted by a period of time equal to [the rise time $t_r$+delay time $t_D$] for the rise side of the pulse. The turning-on time is shifted by a period of time equal to [the fall time $t_f$+delay time $t_D$] for the fall side of the pulse, and, thereby, the ON period of the mirror modulation control waveform 5120a overlaps with the ON period of the light source pulse pattern 5805 at least during the period of the LSB-corresponding modulation period $t_{LSB}$.

With this control scheme, in order to secure this overlap in the LSB-corresponding modulation period $t_{LSB}$, the following conditions must be met:

[delay time $t_D$+rise time $t_r$]<LSB-corresponding modulation period $t_{LSB}$, and

[delay time $t_D$+fall time $t_f$]<LSB-corresponding modulation period $t_{LSB}$ Therefore, the present embodiment is configured such that the SLM controller 5530 groups the mirror elements 5111 of the spatial light modulator 5100. Therefore, the emission period of the changed emission profile of the variable light source 5210 is less than the modulation period corresponding to the LSB of the spatial light modulator 5100 and controls the mirror elements 5111 in units of the group.

Figure 19:
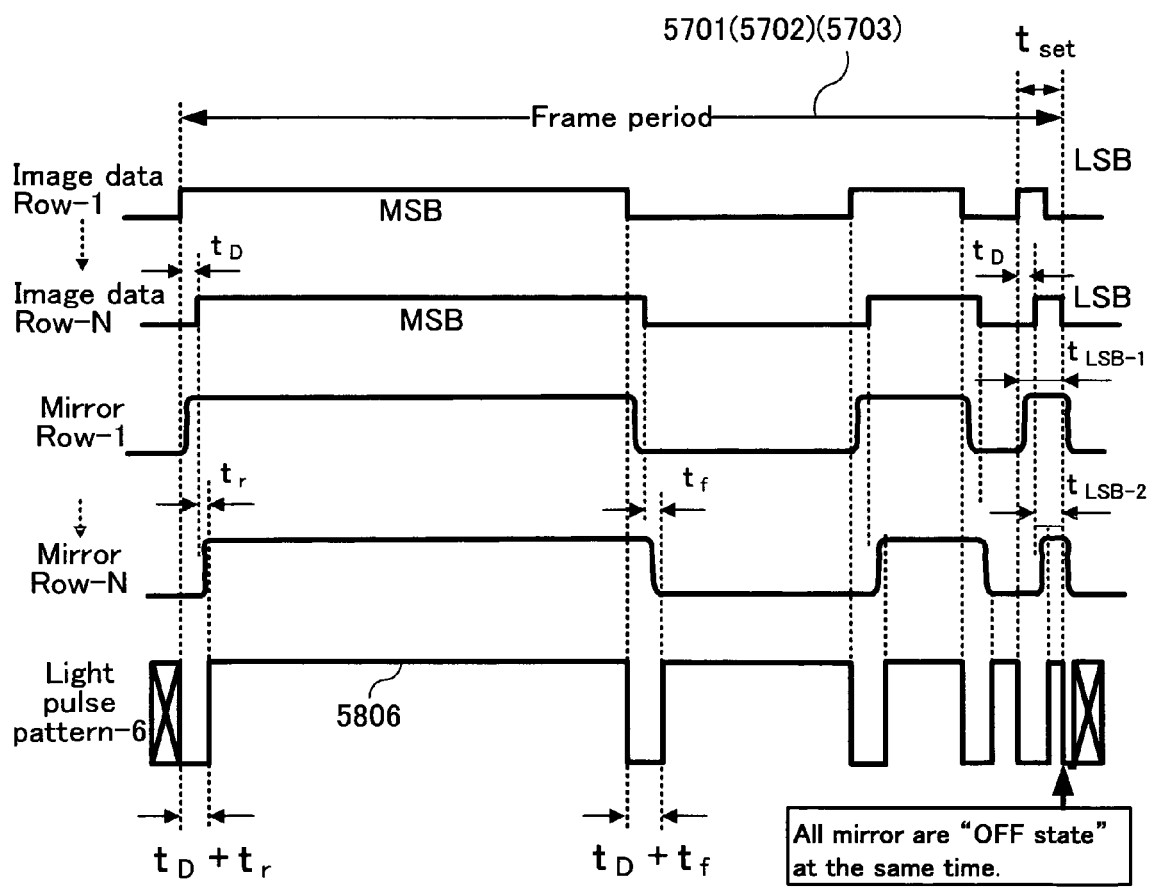
FIG. 19 is a timing diagram showing an exemplary modification of a light source pulse pattern in controlling a mirror by means of binary data performed in a projection apparatus according to a preferred embodiment of the present invention.

Furthermore, the SLM controller 5530 controls changing the modulation periods corresponding to the LSB of the individual mirror elements (i.e., LSB-corresponding modulation period $t_{LSB-1}$ and LSB-corresponding modulation period $t_{LSB-2}$) as required so that the modulation periods corresponding to the LSB (i.e., LSB-corresponding modulation period $t_{LSB}$) of the individual mirror elements 5111 overlap at least in part, as illustrated in FIG. 19.

Figure 20:
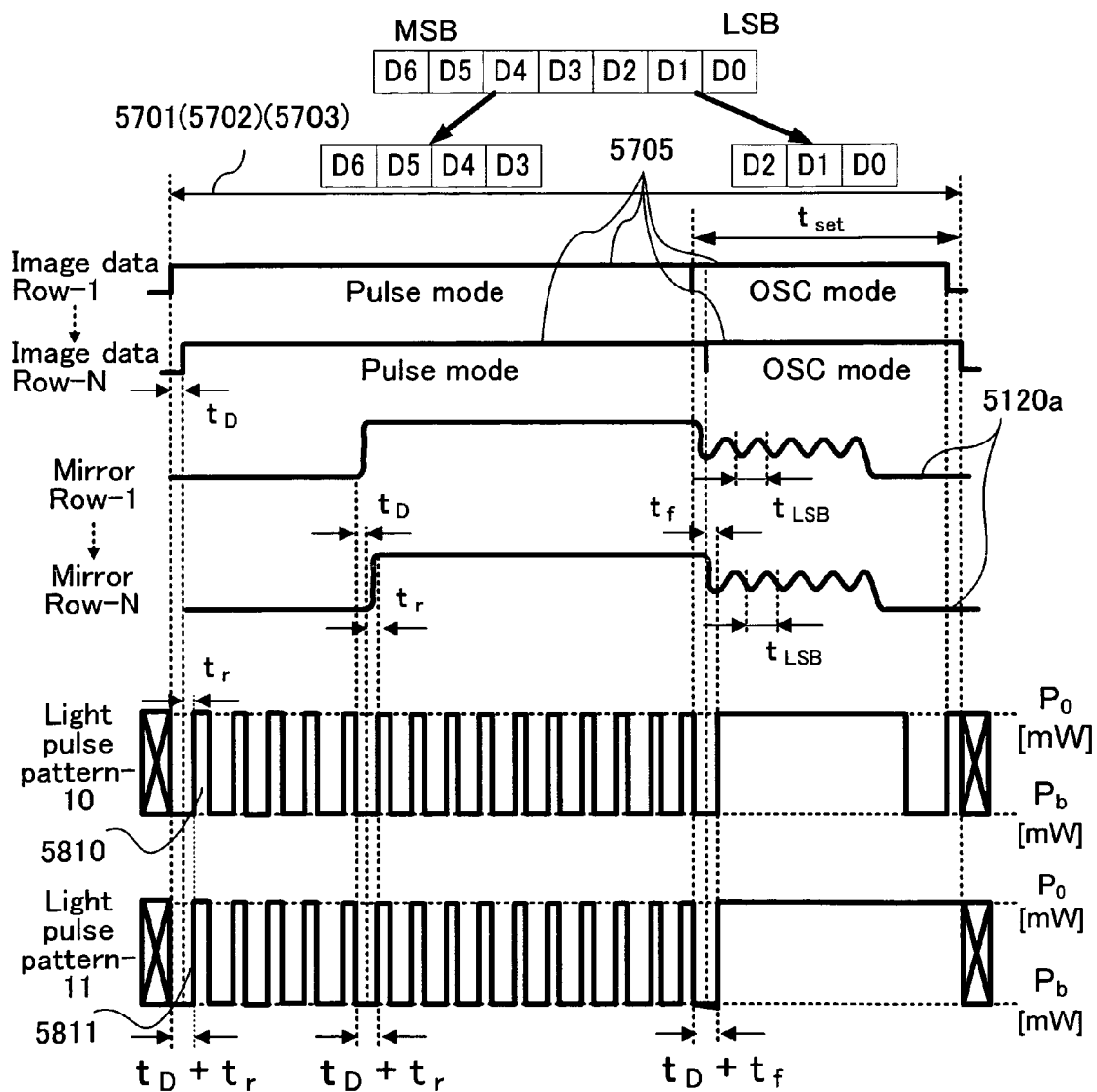
FIG. 20 is a timing diagram showing an exemplary modification of a light source pulse pattern in controlling a mirror by means of non-binary data performed in a projection apparatus according to a preferred embodiment of the present invention.

Here follows a description of the control of a spatial light modulator (SLM) using non-binary data, with reference to FIGS. 17, 20, and 21.

In these figures, the SLM controller 5530 controls the spatial light modulator 5100 using the non-binary image data (i.e., non-binary data 5705).

As shown in FIGS. 17 and 20, when a modulation control for the spatial light modulator 5100 is carried out via non-binary data 5705, which has been obtained by converting image data in a binary form into data in a non-binary form, sub-frames that have the same display gray scale are generated because each bit of the non-binary data 5705 has the same weight. When a spatial light modulator is thus controlled, the emission profile of a variable light source 5210 corresponding to sub-frames does not need to be changed for each sub-frame, since the display grayscales are the same for the sub-frames.

The examples shown in FIGS. 17 and 20 illustrate a configuration of assigning the upper four bits (D6 through D3) from the MSB to the ON/OFF control of the mirror 5112 and the lower three bits (D2 through D0) toward the LSB to the oscillation control of the mirror 5112, thereby implementing a gray scale control.

Specifically, FIG. 17 illustrates one mirror 5112 (i.e., the mirror element 5111), wherein the turning on and off (i.e., flashing) the variable light source 5210 by means of the ON/OFF control at a predetermined cycle during the ON period of the mirror 5112 (i.e., the mirror modulation control waveform 5120a) in the light source pulse pattern 5807. The start time of an ON/OFF cycle, however, is controlled as to be synchronous with the ON period of a mirror modulation control waveform 5120a by avoiding the rise time $t_r$ of the present mirror modulation control waveform 5120a.

Furthermore, the light source pulse pattern 5807 illustrates the variable light source 5210 as continuously turned on during 1) the ON period of the mirror in which modulation control waveform 5120a shifts to the oscillation (OSC) control mode and 2) the period of the oscillation control mode.

As described above, the flashing of the variable light source 5210 during the ON period of the mirror 5112 makes it possible to attain a display gray scale equal or better than that achieved by the ON/OFF control of the mirror 5112.

The light source pulse pattern 5808 illustrates the variable light source 5210 continuously turning on after turning it off once synchronously with the fall time $t_f$ when the mirror modulation control waveform 5120a shifts from the ON state to oscillation state.

With the light source pulse pattern 5808, the column driver 5120 is turned off during a transition from the ON state of the mirror modulation control waveform 5120a to the oscillation state, and, therefore, noise is reduced in the aforementioned transition period.

The light source pulse pattern 5809 illustrates flashing the variable light source 5210 in a predetermined cycle independent of the ON/OFF state or oscillation state of the mirror modulation control waveform 5120a. However, the variable light source 5210 is controlled by the start of the flashing cycle and is turned off during the rise time $t_r$ and fall time $t_f$ of the mirror modulation control waveform 5120a. This configuration makes it possible to reduce the noise made by the light source during the rise time $t_r$ and fall time $t_f$.

FIG. 20 illustrates the control of the timing of flashing and switching on the variable light source 5210 by taking a delay time $t_D$ into consideration. The aforementioned delay time $t_D$ occurs in the control timing of a mirror element 5111 belonging to a different row of the mirror element array 5110 and the spatial light modulator 5100 is controlled using non-binary data 5705.

The light source pulse pattern 5810 illustrates how the variable light source 5210 is controlled so that it flashes in a predetermined cycle by delaying [delay time $t_D$+rise time $t_r$] and [delay time $t_D$+fall time $t_f$] relative to the ON period of the mirror modulation control waveform 5120a. Additionally, the light source pulse pattern 5810 causes the end of a turning-off period and the end of the oscillation mode of the first row (Row-1) to coincide with one another.

The light source pulse pattern 5811 differs from the above described light source pulse pattern 5810 in that the former causes the end of a turning-off and the end of the oscillation mode of the last row (Row-N) to coincide with each other; otherwise the patterns are similar.

FIG. 21 illustrates a modification of the control of the spatial light modulator 5100 using non-binary data.

In the light source pulse pattern 5812, the heights of the flashing pulse (that is, the emission intensity) of the variable light source 5210 are changed so as to gradually decrease in the OFF, ON, and oscillation states of the mirror modulation control waveform 5120*a*.

The variable light source 5210 is controlled by pulses to flash (noted as "flashing pulse" hereafter) so as 1) to emit light in the emission intensity $P_4$ during, for example, the OFF period of the mirror modulation control waveform 5120*a*, 2) to emit light in the emission intensity $P_3$ during the first half of the ON period of the mirror modulation control waveform 5120*a*, 3) to emit light in the emission intensity $P_2$ in the second half of the ON period, and 4) to emit light in the emission intensity $P_1$ during the oscillation period of the mirror modulation control waveform 5120*a*.

Furthermore, the respective turn-on pulse for the emission light intensities $P_4$, $P_3$, $P_2$, and $P_1$ are constituted by the flashing pulse in finer minute cycles. Controlling the variable light source 5210 by means of the light source pulse pattern 5812 makes it possible to achieve a more delicate display gray scale than the single gray scale display of the spatial light modulator 5100.

What follows is an examination of the pulse emission characteristic of the variable light source 5210 for implementing the above described control according to the present embodiment.

In the multi-panel projection apparatus including the spatial light modulators 5100 for the respective colors and which uses the variable light source 5210 comprising a red 5211, green 5212, and blue 5213 laser light source, as that shown in FIG. 5A, the display period of a sub-frame corresponds to the least significant bit (LSB) for attaining a 10-bit individual color display grayscale is 16.3 [μsec] (refer to FIG. 15B).

Figure 22:
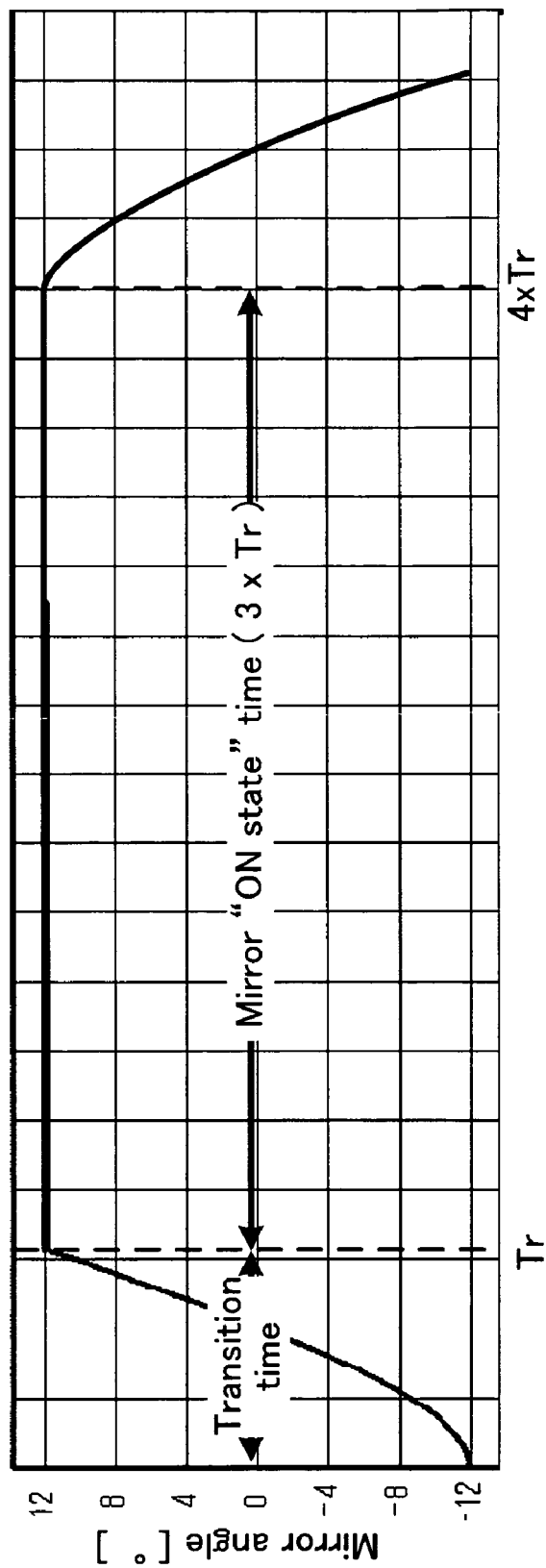
FIG. 22 is a timing diagram showing the transition time in the pulse width modulation of a mirror of the spatial light modulator according to the present embodiment.

In order to limit the transition period between the individual deflection states of a mirror to no more than the equivalent of ⅕*LSB in a common mirror device, it is necessary to achieve a "LSB display period"=4*$t_r$ (where $t_r$ is a rise time) as shown in FIG. 22, requiring the transition time of the mirror 5112 be limited to no more than 4.1 [μsec].

Even applying a mirror device that can achieve the above-described operational characteristic, the light source must be controlled to have a pulse emission with a pulse width of a 9.2 μsec and at least 75% steady state intensity in order for the variable light source 5210 to attain the present pulse emission as that shown in the light source pulse pattern 5801, i.e., Light pulse pattern-1, according to FIG. 16. Therefore, the present embodiment is configured to use the variable light source 5210 and light source control unit 5560 having at least a 9.2 [μsec] pulse emission characteristic.

Furthermore, the following describes a similar examination of the single-panel projection apparatus according to the present embodiment as exemplified in FIG. 5. In the projection apparatus 5010 using the R, G and B variable light sources and a single spatial light modulator 5100, as shown in FIG. 5, the display period of a sub-frame corresponding to the least significant bit (LSB) to achieve a 10-bit individual color display grayscale is 5.43 [μsec] (refer to FIG. 15A).

In order to limit the transition period between the individual deflection states of the mirror 5112 to no more than ⅕*LSB in a common mirror device, it is necessary that the "LSB display period"=4*$t_r$ (where $t_r$ is a rise time) as shown in FIG. 22, which requires the transition time of the mirror 5112 be limited to no more than 1.36 [μsec].

Even applying a mirror device that can achieve the above-described operational characteristic, the light source must be controlled to have a pulse emission with a pulse width of a 3.1 μsec and at least 75% steady state intensity in order for the variable light source 5210 to attain the present pulse emission as that shown in the light source pulse pattern 5801, i.e., Light pulse pattern-1, according to FIG. 16.

Therefore, the present embodiment is configured to use the variable light source 5210 and light source control unit 5560 having at least a 3.1 [μsec] pulse emission characteristic.

What follows are the reasons that the shift angles in the respective deflection state and the shift angles between the individual deflection states must both be set at no higher than ±8 degrees, as described above, for the mirror 5112 of the spatial light modulator 5100 as the present embodiment is configured.

As described above, the present embodiment allows a use of, for example, a semiconductor laser for the red 5211, the green 5212, and the blue 5213 laser light source, as the variable light source 5210.

When a mirror device, as described above, is used as the spatial light modulator 5100 for a projection apparatus, such as the above described projection apparatuses 5010, 5020, and if a semiconductor laser is selected for the variable light source 5210, the characteristics of a semiconductor laser enable a smaller angle to be used as the deflection angle of the mirror 5112 for obtaining a desired contrast than when using a conventional light source, such as a high pressure mercury lamp.

As a result, the structural size of the spatial light modulator 5100 comprising a mirror device and the distance between the mirror 5112 and the address electrodes, such as the ON electrode 5115 and the OFF electrode 5116, can be reduced. Consequently, the Coulomb force, which maintains or changes the deflection state(s) of the mirror 5112 is reduced in proportion to the second power of the distance between the mirror 5112 and the address electrode. This reduction makes it possible to apply a sufficient voltage 1) to the address electrodes, such as the ON electrode 5115 and OFF electrode 5116, and 2) to control the mirror 5112 by taking advantage of a larger Coulomb force, thereby shortening the mirror transition time, such as rise time $t_r$ and fall time $t_f$, which are noted in FIG. 14.

As described above, the present embodiment is configured to change the emission profiles of the variable light source 5210 so as to reduce the mirror transition periods such as rise time $t_r$ and fall time $t_f$.

If the variable light source 5210 produces no emission of light or a reduced emission intensity level, for example, the light source pulse patterns 5801 through 5803 (i.e. the light pulse patterns 1 through 3), which are exemplified in FIG. 16, during the transition period of the mirror 5112, the light intensity obtained in one frame period (or a light intensity obtained by an entire "white" display) will be reduced (i.e., lost) by the length of the transition period of the mirror 5112.

Therefore, decreasing the deflection angle of the mirror 5112, as in the present embodiment, reduces a loss of the light intensity obtained in one frame period and therefore achieves high light-usage efficiency and high accuracy and gradation image display.

Furthermore, the present embodiment reduces the tilt angle of the mirror to no more than ±8 degrees, thereby reducing the difference in potentials (noted as "potential difference" hereafter) to be applied between the mirror 5112 and the address electrodes (i.e., the ON electrode 5115 and OFF electrode 5116) for starting up and driving the mirror 5112 of the spatial light modulator 5100 to deflection states to no higher than 5 volts, and more desirably, no higher than 3.3 volts.

More specifically, since the above-described relationship exists between the voltage, which is to be applied between the mirror 5112 and the address electrodes, and the deflection angles of the mirror 5112 between the deflection states in the spatial light modulator 5100, the spatial light modulator 5100, which is thus enabled for a low-voltage drive, attains a high light-usage efficiency, high accuracy, high-grade gradation image display.

Furthermore, the reduction in size of the mirror 5112 and, accordingly, that of mirror array 5110 are accompanied with the capability of driving the mirror 5112 with a lower applied voltage.

The light source may preferably be a laser light source. As an example, if the numerical aperture NA of the illumination light flux emitted from the laser light source of the projection apparatus is between 0.1 and 0.07, the diameter of the illumination light flux is thin and the depth of focus is long. This makes it possible to increase the degree of freedom in the incident path of the illumination light flux from the light source to the incidence surface on which the laser light enters a prism, within the projection apparatus, or the degree of freedom in designing a layout of the optical system within the projection apparatus. Further, the optical path length of the illumination light path between each laser of the laser light source to the prism or light modulation element can be modified.

Furthermore, in addition to having an ON and an OFF state, it is also possible to use a variable light source that has a semi-ON state, in which an incident light is emitted from the variable light source but no image is projected (i.e., a standby state) or in which no incident light is emitted while the variable light source is being driven (i.e., a standby state). Note that the control for causing the variable light source to be in the ON state (i.e., the driven state), semi-ON state (i.e., a standby state) and OFF state (i.e., the stopped state) can be carried out with the configurations noted above in FIGS. 7A and 7B.

Further, the light source is configured by implementing a plurality of sub-light sources, respectively having a plurality of wavelengths. Each sub-light source may be controlled independently. As an example, only a laser light source having a specific wavelength is turned off or the light intensity is reduced for that source. Further, pulse emissions, which are difficult to perform when using a mercury lamp, can be carried out.

Note that such a control for a variable light source is required to control the pulse emission of the individual variable light sources in high speed, as described above. Therefore, it is preferable to place the light source drive circuit or an output stage circuit (i.e., a switching circuit), the control circuit and an electric current supplier (i.e., a constant current circuit and a bias current circuit) close to each respective variable light source and to layout the circuits to reduce the influence of the floating capacitance and parasitic impedance associated with the harnessing of each circuit wiring. It is also preferable to place these circuits on the same board.

Further, it is clear that the layout of the circuit and the use of heat sink and cooling fan as shown is beneficial for cooling these circuits or the cooling of a board used for placement of these circuits

Third Embodiment

A description of the present embodiment is provided for a light source used in a projection apparatus controllable to operate in a semi-ON state, in addition to an ON state, to emit an incident light for projecting an image and an OFF state in which the power supply for a light source is completely shut off. Note that the present specification document defines the semi-ON state as the state in which an incident light is emitted from a light source and no image is projected, or a state in which no incident light is emitted while the light source is being driven.

What follows is a description of the configuration of a light source for producing the semi-ON state. The semi-ON state is implemented by implementing the light source as shown in FIG. 8B described above.

The electric current of a bias current $I_b$, output from a bias current circuit 5570c as that shown in FIG. 8B, is set at a value whereby an incident light is emitted from the light source at a level that no image is projected, or an incident light is not emitted while the light source is being driven. Then, when no image is projected, all switching circuits are turned off in response to the control signal from a light source control unit to decrease the light intensity of the light source, driving it only with the bias current $I_b$. Specifically, instead of turning off the light source completely when no image is projected, the bias current $I_b$ is continuously flowing. Such a configuration makes it possible to produce a semi-ON state. Further, keeping the light intensity of the light source at a certain level instead of completely turning off the light source eliminates the time required for a current flowing in the circuit to turn on the light source when switching from the state in which no image is projected to the state in which an image is projected. This makes it possible to shorten the emission preparation time for the light source to emit light. As a result, the transition period of the initial turning on time of the light source can be shortened.

More specifically, a smaller emission light intensity is projected when driven by the bias current $I_b$ during a semi-ON state than the emission light intensity P1 corresponding to the least significant bit (LSB). Because of this, the amount of light emitted from the light source during a period corresponding to the LSB in the semi-ON state is no more than an amount of light for displaying an image element with a gray scale represented by the LSB. Note that the present embodiment defines the current applied to a light source in the ON state (i.e., the driven state) and the semi-ON state (i.e., the standby state) as the drive current.

Figure 23:
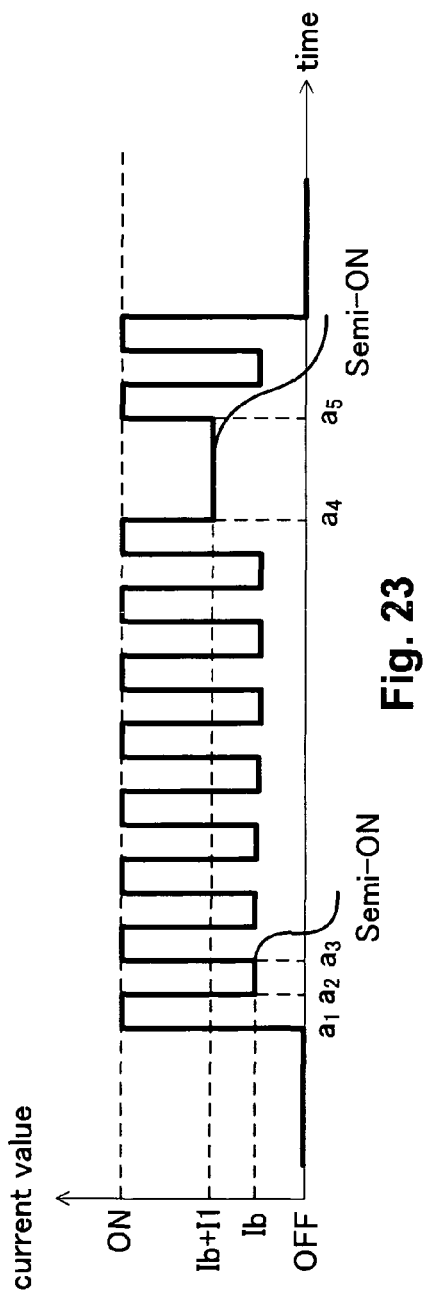
FIG. 23 is a timing diagram for illustrating the semi-ON state of a light source driven with a current in a projection apparatus according to a preferred embodiment of the present invention.

The following is a description of the process of turning a light source to the ON, OFF, and semi-ON states, with reference to FIG. 23. FIG. 23 is a timing diagram for illustrating the semi-ON state of a light source performing on an electric current drive.

The vertical axis in FIG. 23, represents current values, with "ON" indicating a current value, which enables the light source to emit an incident light for projecting an image, and "OFF" indicating a current value which shuts off the power supply for the light source; the horizontal axis shows a time axis, indicating the elapsed time. With reference to FIG. 23, the following is a description of the capability of turning a light source to the ON, OFF and semi-ON states. Prior to time $a_1$: the power supply to the light source is completely shut off, with the current value set at OFF. At time $a_1$: the power supply to the light source is turned on for projecting an image, with the current value set at ON. As a result, an image can be projected. Between time $a_1$ to time $a_2$: the current value is maintained at ON so that images are continuously projected. At time $a_2$: in order to stop projecting an image, the current value of the light source is set at $I_b$. The current $I_b$ is a bias current shown in the above described FIG. 8B. An appropriate setup of the bias current makes it possible to produce the semi-ON state in which an incident light is not emitted and while driving the light source. Between time $a_2$ to time $a_3$: no image is projected and the current value $I_b$ of the bias current is maintained.

At time $a_3$: the current value of the light source is set at ON for restarting the projection of an image. The current values are changed to ON from the current value $I_b$ of the bias current, and thereby the light source can be activated more rapidly than when changing the current values from OFF to ON. Between time $a_3$ to time $a_4$: the light source is controlled to perform pulse emission by repeatedly setting the current value at ON followed by setting the bias current at the current value $I_b$. At time $a_4$: in order to stop projecting an image, the current value for the light source is set at $I_b+I_1$, a current value obtained by adding together the bias current $I_b$ shown in FIG. 8B and a current value $I_1$. The current value $I_1$ can be added to the current value $I_b$ by the light source control unit controlling the switching circuit. An appropriate setup of the current value $I_b+I_1$ produces the semi-ON state in which the light source emits an incident light while no image is projected.

Between time $a_4$ to time $a_5$: no image is projected, and the current value $I_b+I_1$ is maintained. At time $a_5$: in order to restart an image projection, the current value of the light source is set at ON. The current values are changed to ON from $I_b+I_1$, and thereby the light source can be activated more rapidly than when changing the current values from OFF to ON or from the current value $I_b$ of the bias current to ON. The light source control unit controlling the current of the circuit of the light source as described above to produce the ON, OFF, and semi-ON states of the light source. Note that such a control for the light source can be carried out using the configurations noted above in FIGS. 7A and 7B.

A light source includes a semiconductor light source such as a laser diode and a light emitting diode (LED) can be controlled to operate with the semi-ON state. Furthermore, the light source configured, as shown in FIG. 8B, is accompanied by changing over the switching circuit, and therefore it is also possible to adjust the light intensities of the light source in a stepwise fashion. The quantity of light can be adjusted in more minute steps by enabling the pulse emission of a light source. For example, when the light source is performing pulse emission during image projection, the quantity of light during one frame period can be adjusted by adjusting the frequency of pulses in one frame period.

In addition, such a light source may be implemented to include a plurality of sub-light sources. As an example, one laser light source can be configured by bundling multiple sub-laser light sources with the same wavelength. When controlling such a laser light source, the light intensity can easily be adjusted by switching on and off each of the sub-laser light sources. Further, when some of the individual sub-laser light sources, which were constantly ON, are changed to a semi-ON state, and other sub-laser light sources, which were turned off, are turned on when a light intensity is required for projecting a certain image, the light source can be activated more rapidly than the process of turning on the laser light after the sub-laser light sources are completely turned off. It is, of course, possible to produce a semi-ON state by equipping each sub-laser light source with a bias current circuit, as described above, and by applying a bias current constantly to the individual sub-laser light sources.

Note that the example shown in FIG. 8B described above is configured to control the light source with a current drive and change the current to change the light intensities. An alternative configuration may comprise a circuit capable of controlling the voltage by using a voltage-driven light source.

Also note that the present embodiment defines the voltage applied to a light source in the ON state (i.e., the driven state) and the semi-ON state (i.e., the standby state) as drive voltage.

The following is a description for a projection apparatus comprising a light source controllable to operate in the semi-ON state described above.

The projection apparatus implemented with a light source that is controllable to operate in the semi-ON state comprises a spatial light modulator for modulating the incident light emitted from the light source, a light source control unit for controlling the modulation of the light source, and a spatial light modulator control unit for generating, from an input image signal, and a control signal used for driving the spatial light modulator.

The spatial light modulator may be implemented with a mirror device including a plurality of mirror elements used for controlling the reflecting direction of the incident light. Such a mirror device includes the mirror devices described in FIGS. 3A, 3B, 3C, 12 and 13.

The light source control unit receives a control signal used for controlling the light intensity under the semi-ON state and controls a switching circuit for the light source, as shown in FIG. 8B. As an example, the light source control unit controls the intensity of light emitted from the light source by a switch changeover method, while synchronizing with the spatial light modulator based on the control signal obtained from a sequencer, as shown in FIG. 8B.

Furthermore, the light source control unit also controls the pulse emission under the ON state or semi-ON state by a switch changeover method implementing the switching circuit of a light source circuit based on the control signal, as shown in FIG. 8B.

Note that the light source control unit is preferably implemented with a circuit that produces the drive current and/or drive voltage in the semi-ON state at a lower current value and/or voltage value than that for the ON state and higher than that for the OFF state. It might also be possible to configure a new circuit to produce a light intensity emitted from the light source to match exactly the intensity of a semi-ON state. The configuration of such a new circuit for the light source, however, will be complicated in that there is a need to apply a current to the new circuit. Therefore, a switching circuit, as shown in FIG. 8B, involving a circuit that branches the current to be used in the ON state, makes it possible to more efficiently control the light source under a semi-ON state without requiring any more current volume than the drive current required for the ON state with a simple circuit, as shown in FIG. 8B.

The spatial light modulator control unit controls a spatial light modulator in accordance with an image signal. When a spatial light modulator control unit is controlled in sync with the light source control unit, it is possible to modulate the light with the spatial light modulator and project a desired image. In such a projection apparatus, the light source control unit receives a control signal for controlling a light source, controls the light source under an ON state or under a semi-ON state.

Note that a projection apparatus may include a plurality of light sources controllable to operate in the semi-ON state and emitting lights of different wavelengths. Furthermore, in addition to being implemented in the single-panel projection apparatus modulated with a single spatial light modulator as that described in FIG. 5, a light source controllable to operate in the semi-ON state can also be implemented in a multi-panel projection apparatus that includes a plurality of spatial light modulators, as described in FIG. 6. Specifically, the overall control for a single-panel projection apparatus can be carried out by the configuration as illustrated in FIG. 7A, and the overall control for a multi-panel projection apparatus can be carried out by the configuration as illustrated in FIG. 7B.

The following is a description of an exemplary embodiment of carrying out a synchronous control between a spatial light modulator and a light source controllable to operate with the semi-ON state according to the present embodiment.

Figure 24:
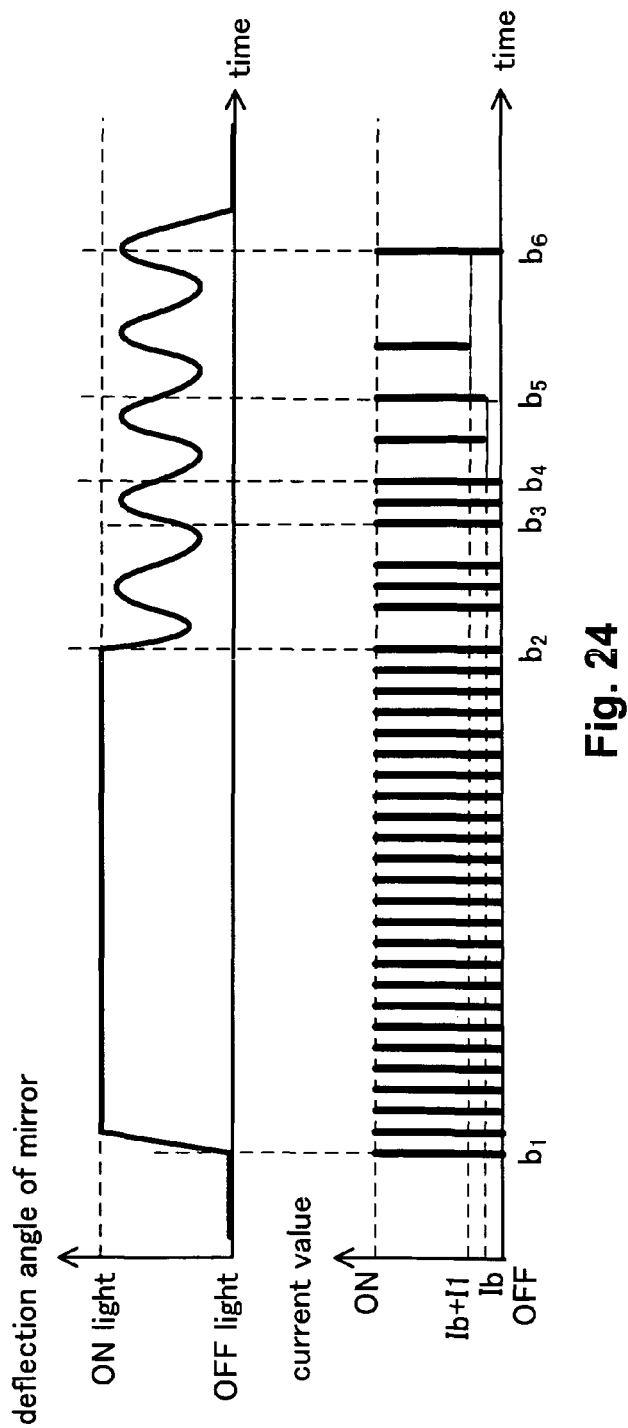
FIG. 24 is a timing diagram for illustrating the semi-ON state when a light source is made to perform pulse emission synchronously with the control of a mirror in a spatial light modulator constituted by mirror element according to a preferred embodiment of the present invention.

FIG. 24 is a timing diagram for illustrating a semi-ON state when a light sources operated under the control of a current drive to project pulse emission in sync with the operation of a mirror of a spatial light modulator that includes arrays of mirror elements.

In FIG. 24, the vertical axis indicates the deflection angle of a mirror and the current i of the light source, defining the deflection angle of a mirror when the incident light is projected in the ON light state as "ON" and that of the mirror when the incident light is in the OFF light state as "OFF". A current value i transmitted to the light source to project a light intensity for projecting an image is defined as "ON", and a current value i, when the power supply to the light source is completely shut off, is defined as "OFF". The horizontal axis indicates a time axis, indicating the elapsed time.

The following is the relationship between time and the light source of the present embodiment:

Prior to the time $b_1$: the deflection angle of a mirror is controlled to be OFF light, and the current value is OFF when the power supply to the light source is completely shut off. At time $b_1$: the deflection angle of the mirror is controlled to be ON light for projecting an image, and the current value is ON as a result of turning on the power supply to the light source. As a result, an image can be projected. Between the time $b_1$ and time $b_2$: the deflection angle of the mirror is controlled to be ON light, and the current value to the light source is repeatedly changed between ON and OFF controlling the light source to perform pulse emission, and thereby the images are projected while adjusting the light intensity.

At time $b_2$: stopping the application of the voltage to the address electrode, which retains the deflection angle of the mirror in the ON position controls the mirror under a free oscillation state in which the mirror oscillates between the deflection angles of the ON and OFF states. Here, the number of pulse emission, with the current values set at ON and OFF, is adjusted.

Between time $b_2$ and time $b_3$: the mirror is in a free oscillation state in which the deflection angles of the mirror oscillates between the ON and OFF light state, and the number of pulse emissions, with the current values set at ON and OFF, is adjusted to three times per one cycle of free oscillation, and thereby the quantity of light for projecting an image is adjusted.

Between the time $b_3$ and time $b_4$: a control similar to the control carried out between the time $b_2$ and $b_3$ is carried out.

Between time $b_4$ and time $b_5$: the number of pulse emission, with the current values set at ON and OFF, is adjusted to two times per one cycle of free oscillation, while maintaining the mirror in a free oscillation. With this control, it is possible to change the intensity of light of the image that has been projected between the time $b_3$ and time $b_4$. Further, between the time $b_4$ and time $b_5$, the current value of the light source when no image is projected is not controlled at OFF (as between the time $b_1$ and time $b_2$), but controlled at $I_b$. The current value $I_b$ is, for example, the bias current shown in FIG. 8B. An appropriate setting of the bias current makes it possible to control the light source under the semi-ON state in which an incident light is not emitted while the light source is being driven. Specifically, between the time $b_4$ and time $b_5$, the pulse emission is carried out with the current value set at ON and $I_b$. During pulse emission, setting the current value of the bias current from $I_b$ to the ON state makes it possible to activate the light source more rapidly than when changing the current value from the OFF to ON state.

Between time $b_5$ and time $b_6$: while maintaining the mirror under a free oscillation, the number of pulse emissions, with the current values set at ON and OFF, is adjusted to two times per one cycle of free oscillation. Meanwhile, between the time $b_5$ and time $b_6$, the current value of the light source is set at $I_b+I_1$ when no image is projected, instead of being set at ON and $I_b$ (as between the time $b_4$ and time $b_5$). The current value $I_b+I_1$ is the current generated by adding a current value $I_1$ to the current value $I_b$ of the bias current shown in FIG. 8B. The light source control unit controls the switching circuit to add the current value $I_1$ to the current $I_b$ of the bias current. An appropriate setting of the current value $I_b+I_1$ makes it possible to control the light source under the semi-ON state, in which it outputs an incident light with which no image is projected. Specifically, between the time $b_5$ and time $b_6$, the pulse emission can be carried out with the current value set at ON and $I_b+I_1$. In this case, when the current values are changed from $I_b+I_1$ to the ON state, it is possible to activate the light source more rapidly than when changing the current values from the OFF to ON state, or from the current value $I_b$, of the bias current, to the ON state.

The light source control unit controls the current of the circuit, as described above, to control the light source under the ON state, semi-ON state, and OFF state, to achieve an appropriate adjustment of the intensity of light emitted from the light source.

As described above, the present embodiment is configured to keep a semiconductor light source turned on at a degree of brightness in which no image is projected or to keep applying the light source with a drive current or drive voltage at a value at which the light source is not turned on and an image is not projected. Such a control enables a more rapid response in changing over between projecting an image and projecting no image, preventing blurriness in a moving image.

Note that the present patent application has illustrated exemplary projection apparatuses and control processes as specific preferred embodiments of the present invention. However, various modifications and changes may be applied to these embodiments within the scope and/or concept of the present invention. Therefore, the present patent application and figures shall be construed as specific embodiments of the invention instead of being limited to those specifically described.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A projection apparatus, comprising:
   a light source;
   a spatial light modulator for modulating the incident light emitted from the light source;
   a spatial light modulator control unit for generating, from an inputted image signal, a control signal for driving the spatial light modulator; and
   a light source control unit for receiving data corresponding to the control signal for controlling the light source to control the light source in a standby state by supplying a current or voltage to the light source while controlling the light source to stop emitting light or a low light intensity in a predefined time period within a display frame period.

2. The projection apparatus according to claim 1, wherein: the light source control unit controls the light source to operate in the standby state during a transient period with the display frame period.

3. The projection apparatus according to claim 1, wherein: the light source control unit controls the light source to perform a pulse emission.

4. The projection apparatus according to claim 1, wherein: the light source further comprises a laser diode or a light emitting diode.

5. The projection apparatus according to claim 1, wherein: the spatial light modulator comprises a plurality of mirror elements each for reflecting and controlling a reflecting direction of the incident light.

6. The projection apparatus according to claim 1, wherein: the light source control unit controls the light source to operate in the standby state during a transient period of rise time at a beginning of the display frame period and a transient period of fall time at the end of the display frame period.

7. The projection apparatus according to claim 1, wherein: the light source control unit operating the light source in the standby state by applying a standby drive current smaller than a drive current for operating the light source in a drive state and greater than a state when the control unit turns off the light source.

8. The projection apparatus according to claim 1, wherein: the light source control unit operates the light source in the standby state by applying a standby drive voltage smaller than a drive voltage for operating the light source in a drive state and greater than a state when the control unit turns off the light source.

9. The projection apparatus according to claim 1, wherein: the light source control unit control the light source to project an amount of light in the standby state is an amount of light for displaying an image element with a gray scale represented by a least significant bit LSB of the inputted image signal.

10. The projection apparatus according to claim 3, wherein: the light source control unit controls the pulse emission of the light source for operating the projection apparatus in a driven state or the standby state during a time when the light source is not turned off by the light control unit.

11. The projection apparatus according to claim 2, wherein: the light source control unit controls the light source to operate in the standby state or in a driven state other than the transient period in the display frame period.

12. The projection apparatus according to claim 1, wherein: the light source includes a red light source, a green light source and a blue light source, wherein the light source control unit controls the red light source, green light source and blue light source to independently operate in the standby state during a time when the light source is not turned off by the light control unit.

13. A method to changeover an image projection for switching a light source, comprising the steps of receiving a control signal for controlling the light source; and controlling the light source for switching between projecting an image and not projecting an image by controlling the light source in a standby state by supplying a current or voltage to the light source while controlling the light source to stop emitting light or a low light intensity in a predefined time period within a display frame period.

14. The method according to claim 13, wherein: the step of controlling the light source further comprising a step of controlling the light source to project an amount of light in the standby state no more than an amount of light for displaying an image element at a gray scale within a period represented by a least significant bit (LSB) of the control signal.

15. The method according to claim 13, wherein: the step of controlling the light source further comprises a step of controlling a semiconductor light source.

16. The method according to claim 13, wherein: the step of controlling the light source further includes a step of controlling the light source with at least three primary colors of light by suppressing an projection of an image when changing over the light source between the three primary colors.

17. A projection apparatus, comprising:
a light source;
a spatial light modulator controllable for modulating the light emitted from the light source to operate in different modulation states;
an electric current supplier for supplying the light source with an electric current;
a plural switches disposed and interconnected in parallel between the light source and electric current supplier; and
a light source control circuit for controlling the switches by controlling the electric current supplier to operate the light source in a standby state to stop emitting light or a low light intensity during a period within a display frame period in accordance with the modulating state of the spatial light modulator.

18. The projection apparatus according to claim 17, wherein: the light source control unit further controls one of the switches for switching on and off the electric current supplier to the light source.

19. The projection apparatus according to claim 17, wherein: the light source control unit further controls the light source in an inactive state to emit an amount of light no greater than an amount for displaying an image element of a gray scale within a period represented by a least significant bit (LSB) of the control signal.

20. The projection apparatus according to claim 19, wherein: the light source control unit controls the light source to operate in the standby state for stopping emitting a light during a transient period of rise time at a beginning of the display frame period and a transient period of fall time at the end of the display frame period.

21. The projection apparatus according to claim 17, wherein: the electric current supplier is disposed near the light source.

22. The projection apparatus according to claim 17, wherein the switch is disposed in the vicinity of the light source.

23. The projection apparatus according to claim 17, further comprising: a board, wherein the electric current supplier and the switch are mounted onto the board.

24. The projection apparatus according to claim 17, further comprising:
 a board, wherein the board is connected to a cooler for cooling the light source.

25. The projection apparatus according to claim 17, wherein:
 the light source is a semiconductor light source arranged as an array.

26. The projection apparatus according to claim 25, wherein:
 the light source control unit further comprising a plurality of control units for controlling the semiconductor light source comprising at least two of the switches.

* * * * *